(12) United States Patent
Cunningham

(10) Patent No.: US 10,851,264 B2
(45) Date of Patent: Dec. 1, 2020

(54) OPTICAL FIBER COATING COMPOSITION

(71) Applicant: NUFERN, East Granby, CT (US)

(72) Inventor: Wells Cunningham, New Hartford, CT (US)

(73) Assignee: Nufern, East Granby, CT (US)

( * ) Notice: Subject to any disclaimer, the term of this patent is extended or adjusted under 35 U.S.C. 154(b) by 75 days.

(21) Appl. No.: 15/906,461

(22) Filed: Feb. 27, 2018

(65) Prior Publication Data

US 2018/0244951 A1 Aug. 30, 2018

Related U.S. Application Data

(60) Provisional application No. 62/464,276, filed on Feb. 27, 2017.

(51) Int. Cl.
| | |
|---|---|
| *C09D 133/14* | (2006.01) |
| *C09D 133/10* | (2006.01) |
| *C09D 133/08* | (2006.01) |
| *G02B 6/00* | (2006.01) |
| *C09D 181/02* | (2006.01) |
| *C03C 13/04* | (2006.01) |
| *C03C 25/106* | (2018.01) |
| *G02B 6/02* | (2006.01) |
| *C08G 75/045* | (2016.01) |
| *C03C 25/26* | (2018.01) |
| *C09D 4/00* | (2006.01) |

(52) U.S. Cl.
CPC .......... *C09D 181/02* (2013.01); *C03C 13/04* (2013.01); *C03C 25/106* (2013.01); *C03C 25/26* (2013.01); *C08G 75/045* (2013.01); *C09D 4/00* (2013.01); *G02B 6/02395* (2013.01); *C03C 2213/00* (2013.01); *C09D 133/08* (2013.01); *C09D 133/10* (2013.01); *C09D 133/14* (2013.01); *G02B 6/02* (2013.01)

(58) Field of Classification Search
CPC .. C09D 133/08; C09D 133/10; C09D 133/14; C09D 188/00; G02B 6/02
See application file for complete search history.

(56) References Cited

U.S. PATENT DOCUMENTS

| | | | |
|---|---|---|---|
| 4,120,721 A | 10/1978 | Keltey | |
| 4,125,644 A * | 11/1978 | Ketley | ................. B05D 7/20 427/498 |
| 4,230,740 A | 10/1980 | Moyer | |
| 4,511,209 A * | 4/1985 | Skutnik | ................. C03C 25/105 385/123 |
| 4,575,188 A | 3/1986 | Ueba | |
| 5,182,360 A | 1/1993 | Jacobine | |
| 5,371,181 A * | 12/1994 | Glaser | ................. C08G 65/332 528/376 |
| 5,459,175 A * | 10/1995 | Woods | ................. C08F 6/02 522/180 |
| 5,558,937 A | 9/1996 | Woods | |
| 5,837,750 A | 11/1998 | Szum | |
| 6,214,899 B1 | 4/2001 | Chawla | |
| 7,155,100 B2 | 12/2006 | Murphy | |
| 7,221,841 B2 | 5/2007 | Chase | |
| 7,239,785 B2 | 7/2007 | DeMartino | |
| 7,521,015 B2 * | 4/2009 | Cheng | ................. C08F 2/46 264/496 |
| 7,660,505 B2 | 2/2010 | Chase | |
| 8,781,282 B2 | 7/2014 | Terruzzi | |
| 9,623,145 B2 * | 4/2017 | Liska | ................. A61L 27/54 |
| 2007/0043205 A1 | 2/2007 | Dias | |
| 2016/0230014 A1* | 8/2016 | Schwalm | ............. C09D 133/14 |
| 2016/0297105 A1 | 10/2016 | Moireau | |
| 2017/0022414 A1* | 1/2017 | Boogaerts | ............. C09K 15/08 |

FOREIGN PATENT DOCUMENTS

WO WO 2015/036421 A1 * 3/2015 ........... C09D 133/14

OTHER PUBLICATIONS

International Search Report in International Patent Application No. PCT/US2018/019912, dated Jul. 1, 2018.

* cited by examiner

*Primary Examiner* — Rip A Lee
(74) *Attorney, Agent, or Firm* — McDonnell Boehnen Hulbert & Berghoff LLP

(57) ABSTRACT

The present disclosure relates to thiol-ene based coating compositions and polymeric compositions that are resistant to high temperature, as well as optical fibers coated with such polymeric compositions. In one aspect, the disclosure provides a radiation-curable optical fiber coating composition that includes at least 20 wt % of one or more at least trifunctional ethylenically unsaturated monomers, each having three or more free radical polymerizable ethylenic unsaturations; at least 20 wt % of one or more at least trifunctional thiol monomers, each having three or more free radical polymerizable thiols; and an effective amount of a free radical photoinitiator, wherein the ratio of the number of polymerizable ethylenic unsaturations of the curable composition to the number of polymerizable thiols of the curable compositions is at least about 1.

22 Claims, 3 Drawing Sheets ic fiber coat-

OPTICAL FIBER COATING COMPOSITION

CROSS-REFERENCE TO RELATED APPLICATIONS

This application claims the benefit of U.S. Provisional Patent Application No. 62/464,276, filed Feb. 27, 2017, which is hereby incorporated herein by reference in its entirety.

BACKGROUND OF THE DISCLOSURE

1. Field of the Disclosure

The present disclosure relates generally to polymeric materials suitable for coating optical fibers. The present disclosure relates particularly to thiol-ene based coating compositions and polymeric compositions that are resistant to high temperature, as well as optical fibers coated with such polymeric compositions.

2. Technical Background

Glass optical fibers are typically coated with one or more polymer coating layers in order to protect the glass surface from chemical and mechanical damage. Such coatings are typically formed from UV-curable systems, in which UV-curable monomers and/or oligomers are cured by the action of a free radical photoinitiator. Such UV-curable compositions often include other components, such as stabilizers and silane coupling agents. For example, optical fibers of the type typically used in telecommunications are coated with UV-curable compositions based on urethane acrylate oligomers. These coatings can provide excellent mechanical and chemical protection to the optical fiber, and can even reduce undesirable optical effects due to microbending.

A number of optical fiber applications require high temperature resistance, for example, up to about 200° C. These include, for example, a variety of sensor applications, such as oil well downhole sensing, as well as medical, aerospace, and industrial applications. While urethane acrylate-based coatings are suitable for most telecommunications uses, they do not have a high temperature resistance.

Polyimide coatings are known for use in high-temperature applications. While polyimides have high temperature resistance, they are impractical for use as optical fiber coatings due to their low shelf life in the uncured state, their slow thermal cure, and their solvent emission during cure. Polyimides must be applied in several thin coats because the carrier solvent must be driven off commensurate with heat cure.

High temperature silicone-based coatings are also known for use in high-temperature applications. Room-temperature vulcanizing (RTV) silicone materials are often used as optical fiber coatings for high-temperature applications. These can have good thermal performance at 200° C., but can be difficult to cleanly strip, and typically are jacketed by some other polymer for industrial applications, which itself can provide a temperature limit to use of the optical fiber. Of significant disadvantage for silicones is that they are cure via heat cure chemistries. This limits pot life, draw speeds and coating thicknesses. In addition, silicones can outgas after cure, which can cause problems for some applications.

A significant advantage for the industry would be the provision of UV curable coatings that would have similar heat resistance to the silicones. Standard optical fiber coating and curing equipment could be used, resulting in faster draw speeds, lower costs and improved yields.

SUMMARY OF THE DISCLOSURE

In one aspect, the present disclosure provides a radiation-curable optical fiber coating composition comprising
  at least 20 wt % of one or more at least trifunctional ethylenically unsaturated monomers, each having three or more free radical polymerizable ethylenic unsaturations;
  at least 20 wt % of one or more at least trifunctional thiol monomers, each having three or more free radical polymerizable thiols; and
  an effective amount of a free radical photoinitiator,
wherein the ratio of the number of polymerizable ethylenic unsaturations of the curable composition to the number of polymerizable thiols of the curable compositions is at least about 1.

In another aspect, the present disclosure provides a cured reaction product of a radiation-curable optical fiber coating composition as described herein. In certain such embodiments, the cured reaction product exhibits no more than 4% weight loss at 500 hours and no more than 6% weight loss at 1000 hours at 200° C. in air In another aspect, the present disclosure provides a coated optical fiber that includes a glass optical fiber comprising a glass core and a glass cladding disposed about the glass core; and a cured reaction product as described herein disposed about the glass optical fiber.

In another aspect, the present disclosure provides a method for making a coated optical fiber, the method including providing a glass optical fiber comprising a glass core and a glass cladding disposed about the glass core; disposing a radiation-curable optical fiber coating composition as described herein on the surface of the glass optical fiber; and curing the radiation-curable optical fiber coating composition disposed on the glass optical fiber by exposing it to ultraviolet radiation.

DETAILED DESCRIPTION

Figure 1:
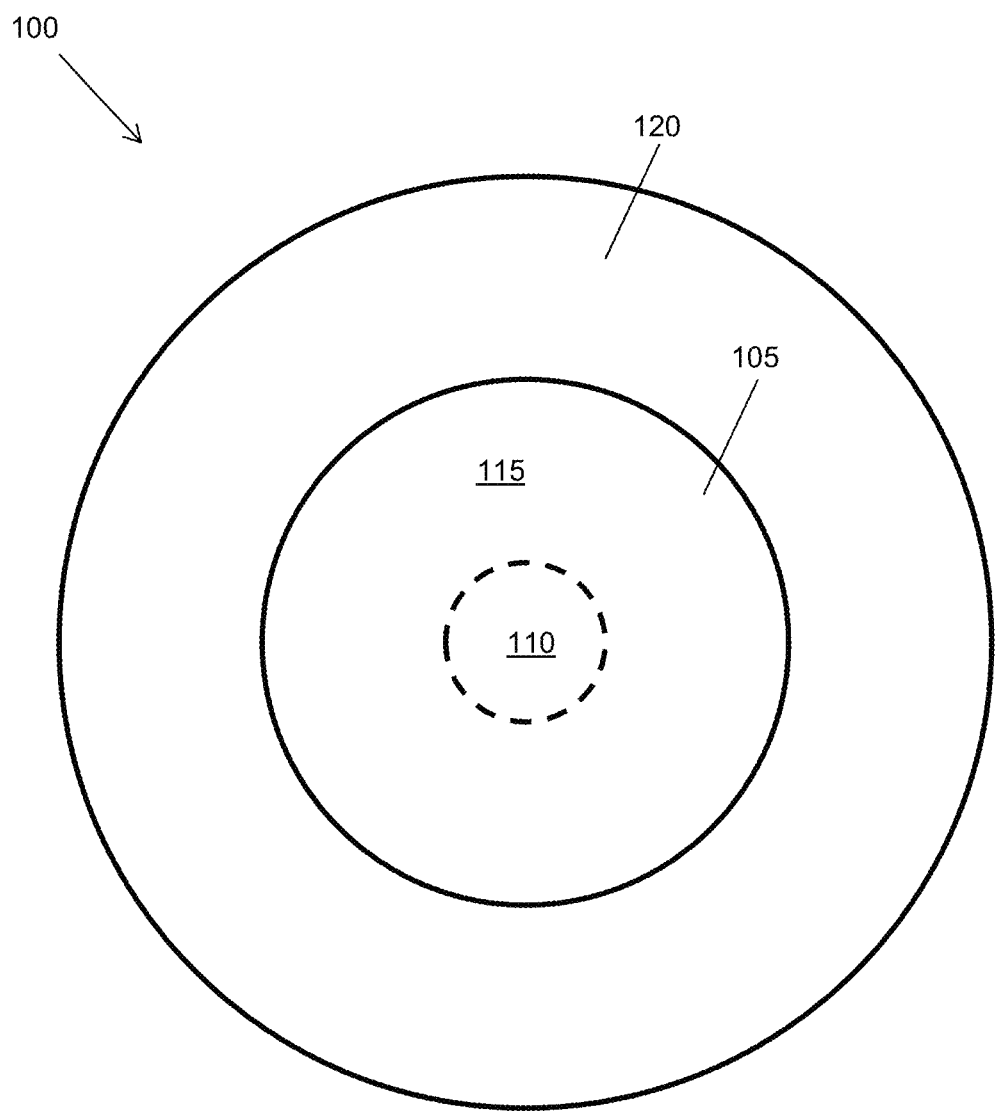
FIG. 1 is a schematic cross-sectional view of a coated optical fiber according to one aspect of the disclosure.

The present inventor has determined that certain highly crosslinked UV-curable compositions based on thiol-ene chemistry can provide optical fiber coatings having very good stability at high temperatures. The present inventor has determined that the thiol-ene-based crosslinked materials described herein can in many cases withstand temperatures of 200° C. in air for extended period times with minimal weight loss. In many cases, the heat resistance (e.g., as measured by weight loss at 200° C. in air) is similar to or better than an industry-standard RTV silicone material currently used as a high-temperature coating. And the heat resistance of the claimed materials is generally much better than that of acrylate- or epoxy-based coatings, even those that are advertised as "high temperature" acrylates and epoxies.

As the person of ordinary skill in the art will appreciate, a "thiol-ene" polymerization is the step-growth polymerization of a polyfunctional thiol monomer (i.e., the "thiol" component) and a polyfunctional ethylenically unsaturated monomer (i.e., the "ene" component). The reaction is initiated by a free radical, advantageously from a photoinitiator, although thermal initiators can likewise be used. Advantageously, the thiol-ene reaction is not inhibited by oxygen, so coatings based on thiol-ene chemistry can provide a non-tacky surface more easily during cure than can coatings based only on (meth)acrylate polymerization. Thiol-ene-based polymerizations are advantaged over UV-curable epoxy polymerizations in that they can provide for much faster curing and for curing through a higher thickness of coating.

One aspect of the disclosure is a radiation-curable optical fiber coating composition that includes at least 20 wt % of one or more at least trifunctional ethylenically unsaturated monomers, each having three or more free radical polymerizable ethylenic unsaturations; at least 20 wt % of one or more at least trifunctional thiol monomers, each having three or more free radical polymerizable thiols; and an effective amount of a free radical photoinitiator.

In the curable compositions according to this first aspect of the disclosure, the ratio of the number of polymerizable ethylenic unsaturations of the curable composition to the number of polymerizable thiols of the curable composition is at least about 1. As the person of ordinary skill in the art will appreciate, ethylenic unsaturations can react either with thiols or with other ethylenic unsaturations. A ratio of polymerizable ethylenic unsaturations to polymerizable thiols in the overall curable composition of at least about 1 will allow for a high degree of cure. In certain such embodiments, the ratio of the number of polymerizable ethylenic unsaturations of the curable composition to the number of polymerizable thiols of the curable composition is at least about 1. A ratio of polymerizable ethylenic unsaturations to polymerizable thiols in the at least trifunctional monomers of at least about 1 will allow for a high degree of crosslinking. In certain embodiments of the curable compositions as otherwise described herein, the ratio of the number of polymerizable ethylenic unsaturations of the curable composition to the number of polymerizable thiols of the curable composition is at least 1.00. In certain such embodiments, the ratio of the number of polymerizable ethylenic unsaturations of the one or more at least trifunctional ethylenically unsaturated monomers to the number of polymerizable thiols of the one or more at least trifunctional thiol monomers is at least 1.00.

The present inventor has surprisingly determined that when the ratio of ethylenic unsaturation to thiol is substantially greater than 1, the cured product can demonstrate a greater thermal resistance. For example, in certain embodiments of the curable compositions as otherwise described herein, the ratio of the number of polymerizable ethylenic unsaturations of the curable composition to the number of polymerizable thiols of the curable composition is at least 1.05, at least 1.10, at least 1.25, or at least 1.35. In certain such embodiments, the ratio of the number of polymerizable ethylenic unsaturations of the curable composition to the number of polymerizable thiols of the curable composition is at least 1.50, at least 1.70, or at least 1.90. In other embodiments of the curable compositions as otherwise described herein, the ratio of the number of polymerizable ethylenic unsaturations of the one or more at least trifunctional ethylenically unsaturated monomers to the number of polymerizable thiols of the one or more at least trifunctional thiol monomers is at least 1.05, at least 1.10, at least 1.25, or at least 1.35. In certain such embodiments, the ratio of the number of polymerizable ethylenic unsaturations of the one or more at least trifunctional ethylenically unsaturated monomers to the number of polymerizable thiols of the one or more at least trifunctional thiol monomers at least 1.50, at least 1.70, or at least 1.90.

While it can be desirable to have an ene:thiol ratio in excess of 1, as described above, it can also be desirable to retain a relatively high degree of thiol-ene curing. In certain embodiments of the curable compositions as otherwise described herein, the ratio of the number of polymerizable ethylenic unsaturations of the curable composition to the number of polymerizable thiols of the curable composition is no more than 5.00, no more than 4.00, or no more than 3.00. In certain such embodiments, the ratio of the number of polymerizable ethylenic unsaturations of the curable composition to the number of polymerizable thiols of the curable composition is no more than 2.75, no more than 2.50, or no more than 2.30. In certain embodiments of the curable compositions as otherwise described herein, the ratio of the number of polymerizable ethylenic unsaturations of the one or more at least trifunctional ethylenically unsaturated monomers to the number of polymerizable thiols of the one or more at least trifunctional thiol monomers is no more than 5.00, no more than 4.00, or no more than 3.00. In certain such embodiments, the ratio of the number of polymerizable ethylenic unsaturations of the one or more at least trifunctional ethylenically unsaturated monomers to the number of polymerizable thiols of the one or more at least trifunctional thiol monomers is no more than 2.75, no more than 2.50, or no more than 2.30.

The present inventor has determined that ene:thiol ratios in the neighborhood of 2:1 can provide especially desirable properties to the cured material. Accordingly, in certain embodiments of the curable compositions as otherwise described herein, the ratio of the number of polymerizable ethylenic unsaturations of the curable composition to the number of polymerizable thiols of the curable composition is in the range of 1.50 to 2.75. In certain such embodiments, the ratio of the number of polymerizable ethylenic unsaturations of the curable composition to the number of polymerizable thiols of the curable composition is in the range of 1.50 to 2.50, or in the range of 1.50 to 2.30, or in the range of 1.70 to 2.75, or in the range of 1.70 to 2.50, or in the range of 1.70 to 2.30, or in the range of 1.90 to 2.75, or in the range of 1.90 to 2.50, or in the range of 1.90 to 2.30. In other such embodiments, the ratio of the number of polymerizable ethylenic unsaturations of the curable composition to the number of polymerizable thiols of the curable composition is in the range of 1.90 to 5.00, or in the range of 1.90 to 4.00, or in the range of 1.90 to 3.00. In certain embodiments of the curable compositions as otherwise described herein, the ratio of the number of polymerizable ethylenic unsaturations of the one or more at least trifunctional ethylenically unsaturated monomers to the number of polymerizable thiols of the one or more at least trifunctional ethylenically unsaturated monomers is in the range of 1.50 to 2.75. In certain such embodiments, the ratio of the number of polymerizable ethylenic unsaturations of the one or more at least trifunctional ethylenically unsaturated monomers to the number of polymerizable thiols of the one or more at least trifunctional ethylenically unsaturated monomers is in the range of 1.50 to 2.50, or in the range of 1.50 to 2.30, or in the range of 1.70 to 2.75, or in the range of 1.70 to 2.50, or in the range of 1.70 to 2.30, or in the range of 1.90 to 2.75, or in the range of 1.90 to 2.50, or in the range of 1.90 to 2.30. In certain such embodiments, the ratio of the number of polymerizable ethylenic unsaturations of the one or more at least trifunctional ethylenically unsaturated monomers to the number of polymerizable thiols of the one or more at least trifunctional ethylenically unsaturated monomers is in the range of 1.90 to 5.00, or in the range of 1.90 to 4.00, or in the range of 1.90 to 3.00.

As the person of ordinary skill in the art will appreciate, the ene:thiol ratios described herein will depend, inter alia, on the relative amounts of ethylenically unsaturated monomers and thiol monomers present, as well as on their molecular weights and their functionalities (e.g., number of polymerizable ethylenic unsaturations per molecule, or number of polymerizable thiols per molecule).

In certain embodiments of the curable compositions as otherwise described herein, the amount of the one or more at least trifunctional ethylenically unsaturated monomers is at least 25 wt %, at least 30 wt %, at least 35 wt %, or at least 40 wt %. The person of ordinary skill in the art will select an amount of the one or more at least trifunctional ethylenically unsaturated monomers that provides, inter alia, a desirably high crosslink density, while providing the cured material with desirable rheological properties.

In certain embodiments of the curable compositions as otherwise described herein, the amount of the one or more at least trifunctional thiol monomers is at least 25 wt %, at least 30 wt %, at least 35 wt %, or at least 40 wt %. The person of ordinary skill in the art will select an amount of the one or more at least trifunctional thiol monomers that provides, inter alia, a desirably high crosslink density, while providing the cured material with desirable rheological properties.

As used herein, the general term "monomer" is intended to encompass any radiation-curable compound having a weight-average molecular weight of 1000 g/mol or less. Radiation-curable materials having weight average molecular weights in excess of 1000 g/mol are identified herein as "oligomers." While such oligomers can be useful as reactive diluents as described below, they typically do not provide sufficient crosslink density to act as desirable at least trifunctional monomers for the purposes described herein. In certain embodiments of the curable compositions as described herein, the weight average molecular weight of the total content of at least trifunctional ethylenically unsaturated monomers is less than 900 g/mol, e.g., less than 750 g/mol, less than 600 g/mol, less than 400 g/mol, or less than 300 g/mol. Similarly, in certain embodiments of the curable compositions as described herein, the weight average molecular weight of the total content of at least trifunctional thiol monomers is less than 900 g/mol, e.g., less than 750 g/mol, less than 600 g/mol, less than 400 g/mol, or less than 300 g/mol.

A wide variety of at least trifunctional ethylenically unsaturated monomers can be used in the practice of the curable compositions of the present disclosure. For example, in certain embodiments of the curable compositions as otherwise described herein, the one or more at least trifunctional ethylenically unsaturated monomers comprise at least one monomer selected from the group consisting of 1,3,5-triallyl-1,3-5-triazine-2,4,6(1H,3H,5H)trione (triallyl isocyanurate); 2,4,6-triallyloxy-1,3,5-triazine (triallyl cyanurate); triallyl trimesate; trimethylolpropane tri(meth)acrylate; ethoxylated trimethylolpropane tri(meth)acrylate; propoxylated trimethylolpropane tri(meth)acrylate; pentaerythritol tetra(meth)acrylate; ethoxylated pentaerythritol tetra(meth)acrylate; propoxylated pentaerythritol tetra(meth)acrylate; pentaerythritol tri(meth)acrylate; ethoxylated pentaerythritol tri(meth)acrylate; propoxylated pentaerythritol tri(meth)acrylate; ethoxylated glyceryl tri(meth)acrylate; propoxylated glyceryl tri(meth)acrylate; tris(2-hydroxyethyl)isocyanurate triacrylate; allylated or (meth)acrylated derivatives of hexamethoxymethylmelamine having the formula $C_3N_3$—$(N(CH_2OR)_2)_3$ in which each R is H, ($C_1$-$C_4$ alkyl)-, allyl-, or (meth)acryl($C_2$-$C_4$alkyl)-, provided that at least 3 Rs are polymerizable) including, e.g., the compound in which each R is allyl, the compound in which 3 R are methyl and 3 R are (meth)acryloxybutyl, and the compound in which 3 R are methyl and 3 R are allyl; the compound of formula (I), below; the compound of formula (II) below; the compound of formula (III) below; the compound of formula (IV) below; the compound of formula (V) below; pentaerythritol allyl ether; and trimethylolpropane allyl ether. In certain such embodiments, at least 50 wt % (e.g., at least 75 wt %, at least 95 wt %, or even at least 98 wt %) of the total amount of the one or more at least trifunctional ethylenically unsaturated monomers is made up of 1,3,5-triallyl-1,3-5-triazine-2,4,6(1H,3H,5H)trione (triallyl isocyanurate); 2,4,6-triallyloxy-1,3,5-triazine (triallyl cyanurate); triallyl trimesate; trimethylolpropane tri(meth)acrylate; ethoxylated trimethylolpropane tri(meth)acrylate; propoxylated trimethylolpropane tri(meth)acrylate; pentaerythritol tetra(meth)acrylate; ethoxylated pentaerythritol tetra(meth)acrylate; propoxylated pentaerythritol tetra(meth)acrylate; pentaerythritol tri(meth)acrylate; ethoxylated pentaerythritol tri(meth)acrylate; propoxylated pentaerythritol tri(meth)acrylate; ethoxylated glyceryl tri(meth)acrylate; propoxylated glyceryl tri(meth)acrylate; tris(2-hydroxyethyl)isocyanurate triacrylate; derivatives of hexamethoxymethylmelamine having the formula $C_3N_3$—$(N(CH_2OR)_2)_3$ in which each R is allyl-, or (meth)acryl($C_2$-$C_4$alkyl)-including, e.g., the compound in which each R is allyl, the compound in which 3 R are methyl and 3 R are (meth)acryloxybutyl, and the compound in which 3 R are methyl and 3 R are allyl; pentaerythritol allyl ether; and/or trimethylolpropane allyl ether.

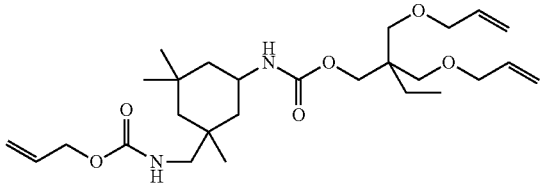

Formula I

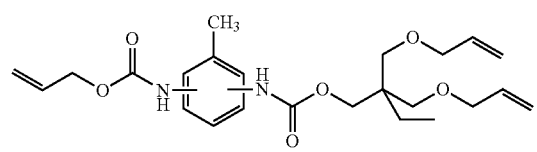

Formula II

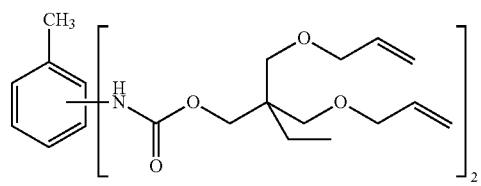

Formula III

-continued

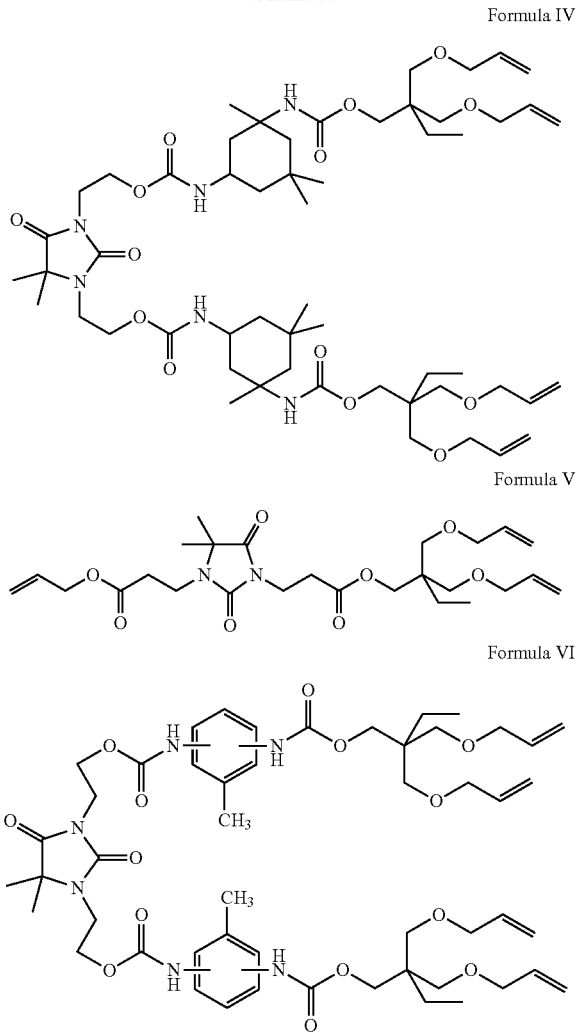

In certain embodiments of the curable compositions as otherwise described herein, the one or more at least trifunctional ethylenically unsaturated monomers comprise at least one monomer selected from the group consisting of 1,3,5-triallyl-1,3-5-triazine-2,4,6(1H,3H,5H)trione (triallyl isocyanurate); 2,4,6-triallyloxy-1,3,5-triazine (triallyl cyanurate); trimethylolpropane tri(meth)acrylate; pentaerythritol tetra(meth)acrylate; and derivatives of hexamethoxymethylmelamine having the formula $C_3N_3$—$(N(CH_2OR)_2)_3$ in which each R is allyl-, or (meth)acryl($C_2$-$C_4$alkyl)-including, e.g., the compound in which each R is allyl, and the compound in which 3 R are methyl and 3 R are allyl. In certain such embodiments, at least 50 wt % (e.g., at least 75 wt %, or at least 95 wt %, or at least 98 wt %) of the total amount of the one or more at least trifunctional ethylenically unsaturated monomers is made up of 1,3,5-triallyl-1,3-5-triazine-2,4,6(1H,3H,5H)trione (triallyl isocyanurate); 2,4,6-triallyloxy-1,3,5-triazine (triallyl cyanurate); trimethylolpropane tri(meth)acrylate; pentaerythritol tetra(meth)acrylate; and/or derivatives of hexamethoxymethylmelamine having the formula $C_3N_3$—$(N(CH_2OR)_2)_3$ in which each R is allyl-, or (meth)acryl($C_2$-$C_4$alkyl)-including, e.g., the compound in which each R is allyl, and the compound in which 3 R are methyl and 3 R are allyl.

In certain embodiments of the curable compositions as otherwise described herein, the one or more at least trifunctional ethylenically unsaturated monomers comprise at least one monomer selected from the group consisting of 1,3,5-triallyl-1,3-5-triazine-2,4,6(1H,3H,5H)trione (triallyl isocyanurate) and 2,4,6-triallyloxy-1,3,5-triazine (triallyl cyanurate). In certain such embodiments, at least 50 wt % (e.g., at least 75 wt %, or at least 95 wt %, or at least 98 wt %) of the total amount of the one or more at least trifunctional ethylenically unsaturated monomers is made up of 1,3,5-triallyl-1,3-5-triazine-2,4,6(1H,3H,5H)trione (triallyl isocyanurate), derivatives of hexamethoxymethylmelamine having the formula $C_3N_3$—$(N(CH_2OR)_2)_3$ in which each R is allyl-, or (meth)acryl($C_2$-$C_4$alkyl)-including, e.g., the compound in which each R is allyl, and the compound in which 3 R are methyl and 3 R are allyl; and/or 2,4,6-triallyloxy-1,3,5-triazine (triallyl cyanurate).

In certain embodiments of the curable compositions as otherwise described herein, the one or more at least trifunctional ethylenically unsaturated monomers comprise at least one at least trifunctional ethylenically unsaturated aromatic monomer. Examples of such monomers include, for example, 1,3,5-triallyl-1,3-5-triazine-2,4,6(1H,3H,5H)trione (triallyl isocyanurate); 2,4,6-triallyloxy-1,3,5-triazine (triallyl cyanurate); triallyl trimesate; allylated or (meth)acrylated derivatives of hexamethoxymethylmelamine having the formula $C_3N_3$—$(N(CH_2OR)_2)_3$ in which each R is H, ($C_1$-$C_4$ alkyl)-, allyl-, or (meth)acryl($C_2$-$C_4$alkyl)-, provided that at least 3 Rs are polymerizable) including, e.g., the compound in which each R is allyl, the compound in which 3 R are methyl and 3 R are (meth)acryloxybutyl, and the compound in which 3 R are methyl and 3 R are allyl; the compound of formula (I), below; the compound of formula (II) below; the compound of formula (III) below; the compound of formula (IV) below; and the compound of formula (V) below. In certain embodiments, at least 50 wt % (e.g., at least 75 wt %, at least 95 wt %, or at least 98 wt %) of the total amount of at least trifunctional ethylenically unsaturated monomer is made up of aromatic monomers.

In certain embodiments of the curable compositions as otherwise described herein, the one or more at least trifunctional thiol monomers include at least one monomer selected from the group consisting of tris(2-(3-mercaptopropionyloxy)ethyl)isocyanurate; tris(2-(3-mercaptobutyloxy)ethyl) isocyanurate; trimethylolpropane tris(3-mercaptopropionate); pentaerythritol tetrakis(3-mercaptopropionate); dipentaerythritol hexa(3-mercaptopropionate); trimethylolpropane tris(thioglycolate); tris[2-(2-mercaptoacetyloxy)ethyl]isocyanurate; pentaerythritol tetrakis(3-thioglycolate); dipentaerythritol hexa(thioglycolate); 2,3-(dimercaptoethylthio)-1-mercaptopropane; and 1,2,3-trimercaptopropane. For example, in certain such embodiments, at least 50 wt % (e.g., at least 75 wt %, or at least 95 wt %, or at least 98 wt %) of v the total amount of the one or more at least trifunctional thiol monomers is made up of tris(2-(3-mercaptopropionyloxy)ethyl)isocyanurate; tris(2-(3-mercaptobutyloxy)ethyl)isocyanurate; trimethylolpropane tris(3-mercaptoproprionate); pentaerythritol tetrakis(3-mercaptoproprionate); dipentaerythritol hexa(3-mercaptoproprionate); trimethylolpropane tris(thioglycolate); tris[2-(2-mercaptoacetyloxy)ethyl] isocyanurate; pentaerythritol tetrakis(3-thioglycolate); dipentaerythritol hexa(thioglycolate); 2,3-(dimercaptoethylthio)-1-mercaptopropane; and/or 1,2,3-trimercaptopropane.

In certain embodiments of the curable compositions as otherwise described herein, the one or more at least trifunctional thiol monomers include at least one monomer selected from the group consisting of tris(2-(3-mercaptopropionyloxy)ethyl)isocyanurate; trimethylolpropane tris(3-mercaptoproprionate); pentaerythritol tetrakis(3-mercaptoproprionate); dipentaerythritol hexa(3-mercaptoproprionate); and tris[2-(2-mercaptoacetyloxy)ethyl]isocyanurate. For example, in certain such embodiments, at least 50 wt % (e.g., at least 75 wt %, or at least 95 wt %, or at least 98 wt %) of v the total amount of the one or more at least trifunctional thiol monomers is made up of tris(2-(3-mercaptopropionyloxy)ethyl)isocyanurate; trimethylolpropane tris(3-mercaptoproprionate); pentaerythritol tetrakis(3-mercaptoproprionate); dipentaerythritol hexa(3-mercaptoproprionate); and/or tris[2-(2-mercaptoacetyloxy)ethyl]isocyanurate.

In certain embodiments of the curable compositions as otherwise described herein, the one or more at least trifunctional thiol monomers comprise at least one at least trifunctional aromatic thiol monomer. Examples of such monomers include, for example, tris(2-(3-mercaptopropionyloxy)ethyl)isocyanurate; tris(2-(3-mercaptobutyloxy)ethyl)isocyanurate; and tris[2-(2-mercaptoacetyloxy)ethyl]isocyanurate. In certain embodiments, at least 50 wt % (e.g., at least 75 wt %, at least 95 wt %, or at least 98 wt %) of the total amount of at least trifunctional thiol monomer is made up of aromatic monomers.

As the person of ordinary skill in the art will appreciate, the curable compositions described herein can include other polymerizable components, such as monofunctional monomers, difunctional monomers, and polymerizable oligomers. The person of ordinary skill in the art will select additional polymerizable components to provide the curable composition and/or the cured product thereof with desirable properties, such as desirable viscosity, desirable hardness, desirable modulus, desirable cure speed and a desirable wavelength sensitivity to a given source of initiating radiation.

For example, in certain embodiments of the curable compositions as otherwise described herein, the curable composition further includes one or more monofunctional or difunctional ethylenically unsaturated monomers. Suitable monofunctional or difunctional ethylenically unsaturated monomers include, for example, trimethylolpropane diallyl ether, trimethylolpropane di(meth)acrylate, allyl- or (meth)acryl terminated polyols, allyl- or (meth)acryl-terminated urethane oligomers, maleimides, bisallyl bisphenol A; ortho, ortho-bisallyl bisphenol A, bisphenol A di(meth)acrylate, alkoxylated bisphenol A di(meth)acrylate, bisphenol A diglycidyl ether di(meth)acrylate, isobornyl (meth)acrylate, phenoxyethyl (meth)acrylate, N,N-dimethylacrylamide, N,N-diethylacrylamide, hexyl (meth)acrylate, 2-ethylhexyl (meth)acrylate, isobornyl (meth)acrylate, decyl (meth)acrylate, lauryl (meth)acrylate, stearyl (meth)acrylate, 2-ethoxyethoxy-ethyl (meth)acrylate, lauryl vinyl ether, 2-ethylhexyl vinyl ether, N-vinyl formamide, isodecyl (meth)acrylate, isooctyl (meth)acrylate, vinyl-caprolactam, N-vinyl pyrrolidone, ethyleneglycolphenylether (meth)acrylate, polyethyleneglycolphenylether (meth)acrylate, polypropyleneglycolphenylether (meth)acrylate, alkyl-substituted phenyl derivatives of the above monomers, such as polyethyleneglycolnonylphenyl-ether (meth)acrylate, $C_2$-$C_{18}$ hydrocarbon-diol di(meth)acrylate, $C_4$-$C_{18}$ hydrocarbon divinyl ethers, 1,6-hexanediol di(meth)acrylate, hexanedioldivinylether, triethylene-glycol di(meth)acrylate, ethoxylated bisphenol-A di(meth)acrylate, and tripropyleneglycol di(meth)acrylate and diallylphthalate. In certain such embodiments, the total amount of any monofunctional or difunctional ethylenically unsaturated monomers is no more than 50 wt % of the curable composition, e.g., no more than 40 wt %, no more than 30 wt %, no more than 20 wt %, no more than 10 wt %, no more than 5 wt %, or no more than 1 wt %.

Similarly, in certain embodiments of the curable compositions as otherwise described herein, the curable composition further includes one or more monofunctional or difunctional thiol monomers. Suitable monofunctional or difunctional thiol monomers include, for example, 2,5-dimercaptomethyl-1,4-dithiane, 2,3-dimercapto-1-propanol, 2-mercapto-ethylsulfide, ethylene glycol bis(thioglycolate), ethylene glycol bis(3-mercaptopropionate), 1,6-hexanedithiol, 1,2-benzenedithiol, 1,3-benzenedithiol, and isophorone diurethane thiol. In certain such embodiments, the total amount of any monofunctional or difunctional thiol monomers is no more than 50 wt % of the curable composition, e.g., no more than 40 wt %, no more than 30 wt %, no more than 20 wt %, no more than 10 wt %, no more than 5 wt %, or no more than 1 wt %. In certain such embodiments, the total amount of any monofunctional thiol monomers is no more than 5 wt % of the curable composition, e.g., no more than 1 wt %.

In certain embodiments of the curable compositions as otherwise described herein, the curable composition further includes one or more oligomers that are copolymerizable with the thiol monomers and the ethylenically unsaturated monomers. Such oligomers can be used, for example, to modify the viscosity of the curable composition to provide for ease of application to an optical fiber and subsequent UV cure in an in-line process, as is conventional in the optical fiber arts. Suitable types of oligomers include epoxy (meth)acrylates, (meth)acrylate-terminated polyglycols or other polyethers, (meth)acrylate-terminated polyesters, and (meth)acrylate-terminated urethane oligomers. In certain such embodiments, the total amount of any copolymerizable oligomers is no more than 50 wt % of the curable composition, e.g., no more than 40 wt %, no more than 30 wt %, no more than 20 wt %, no more than 10 wt %, no more than 5 wt %, or no more than 1 wt %.

The person of ordinary skill in the art will appreciate based on the present disclosure that prepolymeric thiol-ene oligomers can be formed and used in the preparation of an optical fiber coating. For example, a curable composition as described herein (e.g., including an excess of the thiol component or the ethylenically unsaturated component) can be only partially cured to provide a thiol-ene oligomer. Alternatively, an oligomeric thiol-ene can be made by providing thiol and ethylenically unsaturated monomers in a desired stoichiometry to provide a desired average molecular weight of an oligomer made by exhaustively curing the material. In either event, such an oligomer can retain unreacted thiol and/or ethylenically unsaturated moieties that can react further with each other or with other monomers to form a final cured polymer.

In certain embodiments of the curable compositions as otherwise described herein, one or more monomers and/or oligomers that cure via different chemistries, such as epoxies and isocyanates, are also present. For example, when the curable composition further includes an epoxy monomer, a UV cationic initiator can be included in the formulation, so that the epoxy monomers can react with one another under the UV-curing conditions of the thiol-ene curing reaction. Epoxies and/or isocyanates can also be cured in a separate curing step. For example, UV-curing can be used to make a thiol-ene matrix, and thermal curing with time and/or heat can allow the epoxy and/or isocyanate materials to cure to provide the final cured material.

As the person of ordinary skill in the art will appreciate, the curable compositions as otherwise described herein can be made to be substantially solvent-free. For example, in certain embodiments, the curable compositions as otherwise described herein have less than 5 wt %, less than 2 wt %, or even less than 1 wt % solvent (i.e., over and above any adsorbed water).

As noted above, the curable compositions of the first aspect of the disclosure include an effective amount of a free radical photoinitiator. In certain desirable embodiments, the free radical photoinitiator is a UV photoinitiator. The effective amount of the free radical photoinitiator is an amount effective to cure the curable composition to a cross-linked polymer, and can be determined by the person of ordinary skill in the art. The free radical photoinitiator can be present in the composition at a rate of, for example, 0.01 wt % to 10 wt %, e.g., 0.01 wt % to 5 wt %, 0.01 wt % to 2 wt %, 0.1 wt % to 10 wt %, 0.1 wt % to 5 wt %, 0.1 wt % to 2 wt %, 0.5 wt % to 10 wt %, 0.5 wt % to 5 wt %, 1 wt % to 10 wt %, or 1 wt % to 5 wt %. Photoinitators can be provided as combinations of photointiators. Suitable free radical photoinitators include, for example, 2-hydroxy-2-methyl-1-phenypropan-1-one (PHOTOCURE 1173), 2,4,6 trimethylbenzoyl phenylphosphinic acid ethyl ester (IRGACURE 754), Benzeneacetic acid, .alpha.-oxo-, 1,1'-(oxydi-2,1-ethanediyl) (IRGACURE TPO-L); and combinations thereof. Examples of free radical photoinitiators also include benzoin and substituted benzoin compounds, benzophenone, Michler's ketone, dialkoxybenzophenones, dialkoxyacetophenones, and peroxyesters. The person of ordinary skill in the art will select a photointiator to provide curing at the desired wavelength and with the desired speed.

The person of ordinary skill in the art will appreciate that other additives, such as stabilizers, adhesion promoters, light sensitive and light absorbing components, lubricants, wetting agents and/or antioxidants can be used in the curable compositions described herein, as is conventional in the optical fiber coating art. The selection of additive will depend on the type of fiber optic material which is being formulated. The selection and use of such additives is within the skill of the art.

For example, in certain embodiments of the curable compositions as otherwise described herein, a stabilizer is present. Free radical inhibitors can be used, for example, Benzenepropanoic acid, 3,5-bis(1,1 dimethyl)-4-hydroxy-, C7-9 branched alkyl esters 3,5-bis(1,1-dimethylethyl)-4-hydroxybenzenepropanoic acid (Irganox L135), C7-9-branched alkyl esters (IRGANOX 1135), sulfur, phenothiazine, hydroquinone and butylated hydroxytoluene, e.g., in amounts of about 0.5% to about 5%. Stabilizer systems are also described in U.S. Pat. No. 5,459,173.

In certain embodiments of the curable compositions as otherwise described therein, an adhesion promoter is present. The adhesion promoter can be, for example, a silane coupling agent. Suitable silane coupling agents include, e.g., a mercaptofunctional silane such as gamma-mercaptopropyltrimethoxysilane, and a (meth)acrylate-functional silane such as a vinyltrimethoxysilane or a gamma-trimethoxysilylpropyl (meth)acrylate. Adhesion promoters can be used in any suitable amount, e.g., about 0.1 wt % to about 3 wt %.

In certain particular embodiments, the curable compositions as otherwise described herein include at least 35 wt % of the one or more at least trifunctional thiol monomers; and at least 35 wt % of the one or more at least trifunctional ethylenically-unsaturated monomers; and the ratio of the number of polymerizable ethylenic unsaturations of the curable composition to the number of polymerizable thiols of the curable composition is 1.25-5.00.

In certain particular embodiments, the curable compositions as otherwise described herein include at least 35 wt % of the one or more at least trifunctional thiol monomers, the weight average molecular weight of the at least trifunctional ethylenically unsaturated monomers being less than 900 g/mol; at least 35 wt % of the one or more at least trifunctional ethylenically-unsaturated monomers, the weight average molecular weight of the at least trifunctional thiol monomers being less than 900 g/mol; and the ratio of the number of polymerizable ethylenic unsaturations of the curable composition to the number of polymerizable thiols of the curable composition is 1.25-5.00.

In certain particular embodiments, the curable compositions as otherwise described herein include at least 35 wt % of the one or more at least trifunctional thiol monomers, in which at least 75% of the total amount of the one or more at least trifunctional ethylenically unsaturated monomers is made up of 1,3,5-triallyl-1,3-5-triazine-2,4,6(1H,3H,5H)trione (triallyl isocyanurate); 2,4,6-triallyloxy-1,3,5-triazine (triallyl cyanurate); trimethylolpropane tri(meth)acrylate; pentaerythritol tetra(meth)acrylate; and/or derivatives of hexamethoxymethylmelamine having the formula $C_3N_3$—$(N(CH_2OR)_2)_3$ in which each R is allyl-, or (meth)acryl($C_2$-$C_4$alkyl)-including, e.g., the compound in which each R is allyl, and the compound in which 3 R are methyl and 3 R are allyl; and at least 35 wt % of the one or more at least trifunctional ethylenically-unsaturated monomers, in which at least 75% of the total amount of the one or more at least trifunctional thiol monomers is made up of tris(2-(3-mercaptopropionyloxy)ethyl)isocyanurate; tris(2-(3-mercaptobutyloxy)ethyl)isocyanurate; trimethylolpropane tris(3-mercaptoproprionate); pentaerythritol tetrakis(3-mercaptoproprionate); dipentaerythritol hexa(3-mercaptoproprionate); trimethylolpropane tris(thioglycolate); tris[2-(2-mercaptoacetyloxy)ethyl] isocyanurate; pentaerythritol tetrakis(3-thioglycolate); dipentaerythritol hexa(thioglycolate); 2,3-(dimercaptoethylthio)-1-mercaptopropane; and/or 1,2,3-trimercaptopropane; and the ratio of the number of polymerizable ethylenic unsaturations of the curable composition to the number of polymerizable thiols of the curable composition is 1.25-5.00.

The present inventor has determined that the radiation-curable optical fiber coating compositions described herein can be made to form highly heat-resistant coatings. For example, certain embodiments of the curable compositions as otherwise described herein exhibit no more than 4% weight loss at 500 hours and no more than 6% weight loss at 1000 hours at 200° C. in air when cured as a film 7 mm in thickness by exposure to a metal halide lamp and then allowed to age for at least one day before heat testing. In certain embodiments, the curable compositions as otherwise described herein exhibit no more than 3% weight loss at 500 hours and no more than 5% weight loss at 1000 hours at 200° C. in air when cured as a film 7 mm in thickness by exposure to a metal halide lamp and then allowed to age for at least one day before heat testing.

The curable compositions described herein can have a variety of viscosities. And, as mentioned above, the person of ordinary skill in the art can select various components to provide a desirable viscosity for a particular end use. For example, for use as an optical fiber coating, the curable compositions as otherwise described herein can have a viscosity in the range of 100 cP-20,000 cP (e.g., 1000 cP-5000 cP) at 25° C.

The person of ordinary skill in the art will appreciate that other coating physical properties such as modulus and hardness can be adjusted using monomers and oligomers of more or less molecular rigidity or flexibility. The properties can be adjusted depending on the end use of the optical fiber to be coated with the composition Another aspect of the disclosure is a cured reaction product of a radiation-curable optical fiber coating composition as otherwise described herein. As the person of ordinary skill in the art will appreciate, the cured reaction product can be made by curing the curable compositions as described herein. However, as used herein, a "cured reaction product" of a defined curable composition extends to any composition that includes the polymerized residues of such defined curable composition. For example, such a curable composition can be made by first prepolymerizing one or more of the components into a prepolymer, then more fully polymerizing the prepolymer, optionally with additional of the components, to provide the cured composition.

The cured reaction products described herein can be made to be substantially heat resistant. For example, in certain embodiments, a cured reaction product as otherwise described herein exhibits no more than 4% weight loss at 500 hours and no more than 6% weight loss at 1000 hours at 200° C. in air. In particular embodiments, a cured reaction product as otherwise described herein exhibits no more than 3% weight loss at 500 hours and no more than 6% weight loss at 1000 hours at 200° C. in air.

Another aspect of the disclosure is a coated optical fiber. One embodiment of such a coated optical fiber is shown in schematic cross-sectional view in FIG. 1. Coated optical fiber 100 includes a glass optical fiber 105 that in turn includes a glass core 110 and a glass cladding 115 disposed about the glass core. Coated optical fiber 100 also includes a cured reaction product as described herein disposed about the glass optical fiber as a coating 120. As the person of ordinary skill in the art will appreciate, and as shown in FIG. 1, an optical fiber coating as described herein can be used as a single coating around the optical fiber. In other embodiments, an optical fiber coating as described herein can be used as a secondary coating (e.g., with a conventional primary coating), or can be made with highly flexible oligomers to be used as a primary coating (e.g., with a different material as described herein being used as a secondary coating, or with a conventional secondary coating).

Another aspect of the disclosure is a method for making a coated optical fiber, e.g., the coated optical fiber described above. The method includes providing a glass optical fiber that includes a glass core and a glass cladding disposed about the glass core. The glass optical fiber can be provided, for example, by drawing a glass preform, as is conventional in the optical fiber arts. The fiber can be coated in a process step performed shortly after the draw process, e.g., before the fiber is wound onto a spool. The method further includes disposing a radiation-curable optical fiber coating composition, e.g., any curable composition as described herein, about (e.g., on the surface of) the glass optical fiber. Disposing the curable composition about the fiber can be performed by the person of ordinary skill in the art using, for example, a coating die as is common practice in the optical fiber art. The curable composition, once disposed on the glass optical fiber, is then cured by exposing it to ultraviolet radiation. When used as a primary coating, the curable composition as described herein can be disposed immediately on the surface of the glass optical fiber. When used as a secondary coating, the curable composition as described herein can be disposed on a primary coating composition, which can be disposed on the surface of the glass optical fiber. The person of ordinary skill in the art can adapt conventional optical fiber coating methodologies for use with the curable compositions as described herein.

The compositions and methods of the disclosure are further described by the following non-limiting Examples.

Preparation of formulations: The components of the various example formulations were blended together and stored in light-proof containers. Molecular weights described below are estimated based on information provided by the manufacturer for a given lot of material.

Bulk heat resistance measurements: For a given UV-curable sample, 3-7 grams of a liquid formulation was poured into a weighed aluminum sample dish, allowed to de-air and then exposed to UV light from an iron-doped mercury vapor bulb. The distance was such that the intensity was between 2-15 mW/cm$^2$ when measured with a 365 nm radiometer. Such low doses were used so that the samples did not exotherm and fume or boil over. Total exposure times were around 5 minutes (about 1500 mJ/cm$^2$). Thermal-curable samples were cured as described in individual examples below. The sample was then allowed to cool and checked to ensure full cure. An initial weight was then measured. The sample was placed in an oven set to 200° C.; weights were taken at intervals and losses calculated. Typically, tests were extended to 1000 hours.

Comparative Example 1

Momentive Performance Materials Inc.'s RTV615 is a low-viscosity two-part silicone rubber. Parts A&B were mixed as per the manufacturer's instruction in a sample dish and allowed to set for 24 hours at room temperature. A 50° C. bake for 4 hours followed to ensure full cure before heat resistance testing.

Comparative Example 2

Hexion Corporation KlearShield 1-001 is a UV-curable primary coating for optical fiber.

Comparative Example 3

Hexion Corporation KlearShield 2-002 is a UV-curable secondary coating for optical fiber.

Comparative Example 4

An epoxy acrylate formulation of the following composition was prepared:

| Trade-name | wt % | Chemical Name | CAS reg. # | Supplier |
|---|---|---|---|---|
| L135 | 0.10 | Benzenepropanoic acid, 3,5-bis(1,1 dimethyl)-4-hydroxy-, C7-9 branched alkyl esters | 125643-61-0 | BASF |
| D1173 | 2.00 | 2-Hydroxy-2-methyl-1-phenyl-propane-1-one | 7473-98-5 | BASF |
| TPO | 1.40 | 2,4,6-Trimethyl benzoyldiphenylphosphine oxide | 75980-60-8 | BASF |
| EB3720 | 58.00 | Bisphenol A epoxy acrylate | 211188-62-4 | Allnex |
| CD9038 | 38.50 | Ethoxylated bisphenol A acrylate | 64401-02-1 | Sartomer |

Comparative Example 5

An ester epoxy/polyester polyol formulation of the following composition was prepared:

| Tradename | wt % | Chemical Name | CAS reg. # | Supplier |
|---|---|---|---|---|
| L135 | 0.10 | Benzenepropanoic acid, 3,5-bis(1,1 dimethyl)-4-hydroxy-, C7-9 branched alkyl esters | 125643-61-0 | BASF |
| D1173 | 1.00 | 2-Hydroxy-2-methyl-1-phenyl-propane-1-one | 7473-98-5 | BASF |
| I250 | 2.00 | (4-methylphenyl)[4-(2-methylpropyl)phenyl]iodonium hexafluorophosphate | 344562-80-7 | BASF |
| CER4221 | 40.00 | 3,4-Epoxycyclohexane Methyl 3',4'-Epoxycylohexyl carboxylate | 2386-87-0 | Achiewell |
| Epon 834 | 13.00 | Phenol, 4,4'-(1-methylethylidene)bis-, polymer with 2,2'-[(1-methylethylidene)bis(4,1-phenyleneoxymethylene)]bis[oxirane] | 25036-25-3 | Hexion |
| Polyol 3380 | 25.90 | polyalcohol, alkoxylated | 37625-56-1 | Perstorp |
| K188 | 18.00 | polyester polyol | — | King Industries |

Comparative Example 6

An aliphatic epoxy/polyether polyol formulation of the following composition was prepared:

| Tradename | wt % | Chemical Name | CAS reg. # | Supplier |
|---|---|---|---|---|
| L135 | 0.10 | Benzenepropanoic acid, 3,5-bis(1,1 dimethyl)-4-hydroxy-, C7-9 branched alkyl esters | 125643-61-0 | BASF |
| D1173 | 1.00 | 2-Hydroxy-2-methyl-1-phenyl-propane-1-one | 7473-98-5 | BASF |
| I250 | 2.00 | (4-methylphenyl)[4-(2-methylpropyl)phenyl]-Iodonium hexafluorophosphate | 344562-80-7 | BASF |
| CER4221 | 48.90 | 3,4-Epoxycyclohexane Methyl 3',4'-Epoxycylohexyl carboxylate | 2386-87-0 | Achiewell |
| Capa 310 | 19.00 | polycaprolactone | 37625-56-2 | Perstorp |
| K188 | 29.00 | polyester polyol | — | King Industries |

Comparative Example 7

A crosslinked aromatic epoxy formulation of the following composition was prepared:

| Tradename | wt % | Chemical Name | CAS reg. # | Supplier |
|---|---|---|---|---|
| L135 | 0.10 | Benzenepropanoic acid, 3,5-bis(1,1 dimethyl)-4-hydroxy-, C7-9 branched alkyl esters | 125643-61-0 | BASF |
| D1173 | 1.00 | 2-Hydroxy-2-methyl-1-phenyl-propane-1-one | 7473-98-5 | BASF |
| I250 | 2.00 | (4-methylphenyl)[4-(2-methylpropyl)phenyl]-Iodonium hexafluorophosphate | 344562-80-7 | BASF |
| CER4221 | 64.00 | 3,4-Epoxycyclohexane Methyl 3',4'-Epoxycylohexyl carboxylate | 2386-87-0 | Achiewell |
| DEN 438 | 20.00 | Epoxy Novolac Resin | 28064-14-4 | Dow |
| LHT240 | 12.00 | polypropylene triol | 25791-96-2 | Covestro |

Comparative Example 8

A thiol-ene formulation of the following composition, having a difunctional ethylenically-unsaturated monomer and a trifunctional thiol monomer, was prepared:

| Tradename | wt % | Chemical Name | CAS# | Supplier | Eq. wt. (g/mol) | Eqs. |
|---|---|---|---|---|---|---|
| L135 | 0.10 | Benzenepropanoic acid, 3,5-bis(1,1 dimethyl)-4-hydroxy-, C7-9 branched alkyl esters | 125643-61-0 | BASF | | |
| D1173 | 1.90 | 2-Hydroxy-2-methyl-1-phenyl-propane-1-one | 7473-98-5 | BASF | | |
| TMPDE-90 | 41.50 | Trimethylolpropane diallyl ether | 682-09-7 | Perstorp | 98 | 0.42 |
| TMPTM | 56.50 | Trimethylolpropane tris(3-mercaptopropionate) | 33007-83-9 | Evans Chemetics/ Bruno Bock | 133 | 0.42 |
| | 100.0 | | | | Ratio ene to thiol | 1.00 |

Example 9

A thiol-ene formulation of the following composition, having an aromatic trifunctional ethylenically-unsaturated monomer and an aliphatic trifunctional thiol monomer, was prepared:

| Trade-name | wt % | Chemical Name | CAS# | Supplier | Eq. wt. (g/mol) | Eqs. |
|---|---|---|---|---|---|---|
| L135 | 0.10 | Benzenepropanoic acid, 3,5-bis(1,1 dimethyl)-4-hydroxy-, C7-9 branched alkyl esters | 125643-61-0 | BASF | | |
| D1173 | 2.00 | 2-Hydroxy-2-methyl-1-phenyl-propane-1-one | 7473-98-5 | BASF | | |
| SR533 | 37.90 | 1,3,5-Triallyl-1,3,5-triazine-2,4,6(1H,3H,5H)-trione | 1025-15-6 | Sartomer Corp, Evonik, RT Vanderbilt | 83 | 0.46 |
| TMPTM | 60.00 | Trimethylolpropane tris(3-mercaptopropionate) | 33007-83-9 | Evans Chemetics/ Bruno Bock | 133 | 0.45 |
| | 100.0 | | | | Ratio ene to thiol | 1.01 |

Heat resistance data for the formulations of Comparative Examples 1-8 and Example 9 are presented below:

| | hours at 200° C. | | | | | | | | |
|---|---|---|---|---|---|---|---|---|---|
| Example | 24 | 42 | 72 | 120 | 144 | 168 | 240 | 384 | 528 |
| C1 | −1.13 | −1.34 | −1.58 | −1.77 | −1.84 | −1.93 | −2.15 | −2.57 | −2.99 |
| C2 | −9.29 | −12.89 | −17.08 | −19.43 | −20.20 | −20.83 | −22.12 | −23.13 | −24.69 |
| C3 | −5.25 | −7.03 | −9.83 | −12.22 | −13.21 | −14.10 | −16.17 | −18.68 | −20.46 |
| C4 | −5.70 | −8.31 | −15.70 | −22.06 | −24.21 | −25.84 | −28.78 | −31.51 | −33.68 |
| C5 | −6.72 | −8.51 | −10.43 | −11.54 | −11.84 | −12.11 | −12.63 | −13.22 | −13.73 |
| C6 | −4.30 | −5.40 | −6.52 | −7.00 | −7.16 | −7.20 | −7.58 | −7.91 | −8.18 |
| C7 | −2.46 | −2.80 | −3.19 | −3.48 | −3.61 | −3.75 | −4.13 | −4.60 | −5.04 |
| C8 | −4.72 | −6.18 | −8.43 | −9.96 | −10.28 | −10.50 | −10.97 | −11.56 | −15.49 |
| 9 | −2.09 | −2.50 | −2.89 | −3.22 | −3.33 | −3.46 | −3.74 | −4.09 | −4.40 |

Figure 2:
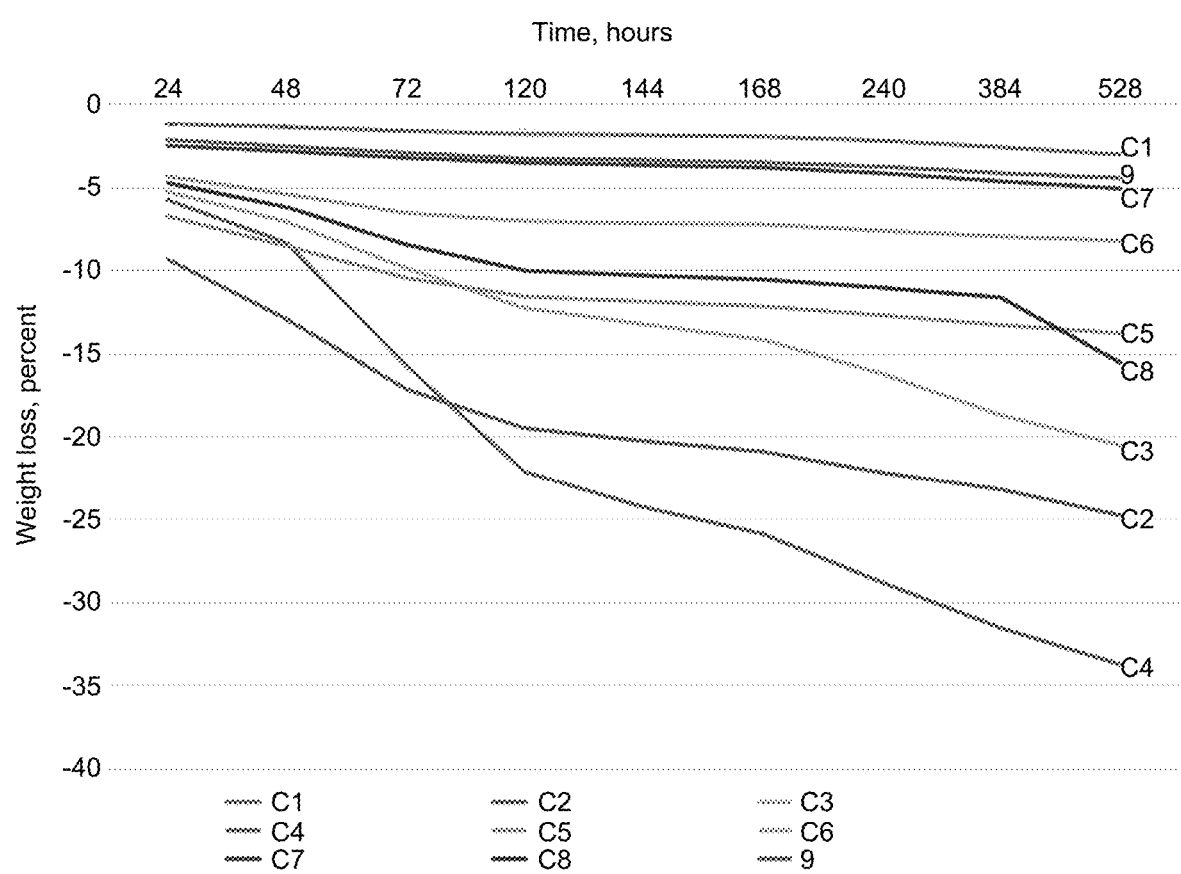
FIG. 2 is a graph of heat testing results for a curable composition according to one embodiment of the disclosure and several comparative examples.

These data are presented in FIG. 2.

As demonstrated by the data for Comparative Example 1, the RTV615 silicone material, an industry standard for 200° C. applications, degrades with a shallow slope showing around 3% weight loss at 500 hours and around 5% or less at 1000 hours (as demonstrated below). Silicones can be advantageous for those low values and for their ability to remain clear and colorless after extended heat treatment, although they can become friable in nature after 1000 hours. But of significant disadvantage for silicones and polyimide coatings is that they are heat cure chemistries. This limits pot life, draw speeds and coating thicknesses. Polyimides must be applied in several thin coats because the carrier solvent must be driven off commensurate with heat cure. In addition, silicones can outgas after cure and this can cause problems for some applications.

Comparative Examples 2 and 3 are standard UV-curable urethane acrylate-based formulations used as the primary and secondary coatings for optical fiber. Under the testing conditions, these lost 20% and 25% by weight at 500 hours. They, like all the non-silicone chemistries in this disclosure, turn dark brown to black by several hundred hours at 200° C.

Comparative Example 4 is an epoxy acrylate system. Despite the fact that the urethane bond is thermodynamically weaker than either the esters of polyacrylates or the ethers of cured epoxy systems, this Example formulation performed even worse than the urethane acrylates of Examples 2 and 3.

Comparative Example 5 is a UV curable epoxy system having backbones of polyester within the difunctional epoxy and the polyester polyol. The epoxy cures with itself and with the polyol to create ethereal linkages. Losing 14% at 500 hours under the test conditions is an improvement over the urethane acrylates of Examples 2 and 3.

Comparable Example 6 is a UV curable exoxy system having an higher ethereal content product through use of a polyether polyol. It demonstrates a significant improvement at 8% loss. This follows the thermodynamic data indicating that the ester linkages are weaker than ethers.

Comparative Example 7 incorporates a higher functional aromatic epoxy into an Example #6 type of formulation. A lower weight loss of 5% was another step improvement and indicates that cross-linking and aromaticity improve stability as would be assumed.

Comparative Example 8 is a UV-curable thiol-ene formulation with a difunctional ethylenically-unsaturated monomer and an equivalent amount of trifunctional thiol monomer. This material suffered a 15% loss after 500 hours at 200° C.

Example 9 is a formulation according to the present disclosure, and demonstrates the performance advantages of the presently described formulations. Example 9 includes a trifunctional ethylenically-unsaturated monomer and an equivalent amount of trifunctional thiol monomer. The weight loss improved dramatically, to the best of the series at <4.5% at 500 hours.

Example 10

A thiol-ene formulation of the following composition, having an aromatic trifunctional ethylenically-unsaturated monomer and an aromatic trifunctional thiol monomer in a ene:thiol ratio of ~2:1, was prepared:

| Trade-name | wt % | Chemical Name | CAS# | Supplier | Eq. wt. (g/mol) | Eqs. |
|---|---|---|---|---|---|---|
| L135 | 0.10 | Benzenepropanoic acid, 3,5-bis(1,1 dimethyl)-4-hydroxy-, C7-9 branched alkyl esters | 125643-61-0 | BASF | | |
| D1173 | 3.78 | 2-Hydroxy-2-methyl-1-phenyl-propane-1-one | 7473-98-5 | BASF | | |
| SR533 | 47.50 | 1,3,5-Triallyl-1,3,5-triazine-2,4,6(1H,3H,5H)-trione | 1025-15-6 | Sartomer Corp, Evonik, RT Vanderbilt | 83 | 0.57 |
| TEMPIC | 48.60 | Tris[2-(mercaptopropionyloxy)ethyl]isocyancurate | 36196-44-8 | Bruno Bock | 182 | 0.27 |
| | 100.0 | | | | Ratio ene to thiol | 2.1 |

Example 11

A thiol-ene formulation of the following composition, having an aromatic trifunctional ethylenically-unsaturated monomer and an aliphatic tetrafunctional thiol monomer in a ene:thiol ratio of ~2:1, was prepared:

| Trade-name | wt % | Chemical Name | CAS# | Supplier | Eq. wt. (g/mol) | Eqs. |
|---|---|---|---|---|---|---|
| L135 | 0.10 | Benzenepropanoic acid, 3,5-bis(1,1 dimethyl)-4-hydroxy-, C7-9 branched alkyl esters | 125643-61-0 | BASF | | |
| D1173 | 3.68 | 2-Hydroxy-2-methyl-1-phenyl-propane-1-one | 7473-98-5 | BASF | | |
| SR533 | 54.40 | 1,3,5-Triallyl-1,3,5-triazine-2,4,6(1H,3H,5H)-trione | 1025-15-6 | Sartomer Corp, Evonik, RT Vanderbilt | 83 | 0.66 |
| PETMP | 41.80 | Pentaerythritol Tetra (3-mercaptopropionate) | 7575-23-7 | Bruno Bock | 122 | 0.34 |
| | | | | | Ratio ene to thiol | 1.9 |

Example 12

A thiol-ene formulation of the following composition, having an aromatic trifunctional ethylenically-unsaturated monomer and an aliphatic tetrafunctional thiol monomer in a ene:thiol ratio of ~1:1, was prepared:

| Trade-name | wt % | Chemical Name | CAS# | Supplier | Eq. wt. (g/mol) | Eqs. |
|---|---|---|---|---|---|---|
| L135 | 0.10 | Benzenepropanoic acid, 3,5-bis(1,1 dimethyl)-4-hydroxy-, C7-9 branched alkyl esters | 125643-61-0 | BASF | | |
| D1173 | 3.10 | 2-Hydroxy-2-methyl-1-phenyl-propane-1-one | 7473-98-5 | BASF | | |
| SR533 | 39.20 | 1,3,5-Triallyl-1,3,5-triazine-2,4,6(1H,3H,5H)-trione | 1025-15-6 | Sartomer Corp, Evonik, RT Vanderbilt | 83 | 0.47 |
| PETMP | 57.60 | Pentaerythritol Tetra (3-mercaptopropionate) | 7575-23-7 | Bruno Bock | 122 | 0.47 |
| | | | | | Ratio ene to thiol | 1.0 |

Example 13

A thiol-ene formulation of the following composition, having an aromatic trifunctional ethylenically-unsaturated monomer and an aliphatic hexafunctional thiol monomer in a ene:thiol ratio of ~2.5:1, was prepared:

| Trade-name | wt % | Chemical Name | CAS# | Supplier | Eq. wt. (g/mol) | Eqs. |
|---|---|---|---|---|---|---|
| L135 | 0.10 | Benzenepropanoic acid, 3,5-bis(1,1 dimethyl)-4-hydroxy-, C7-9 branched alkyl esters | 125643-61-0 | BASF | | |
| D1173 | 3.38 | 2-Hydroxy-2-methyl-1-phenyl-propan-1-one | 7473-98-5 | BASF | | |
| SR533 | 59.00 | 1,3,5-Triallyl-1,3,5-triazine-2,4,6(1H,3H,5H)-trione | 1025-15-6 | Sartomer Corp, Evonik, RT Vanderbilt | 83 | 0.71 |
| Di-PETMP | 37.50 | Dipentaerythritol Hexa (3-mercaptopropionate) | 25359-71-1 | Bruno Bock | 131 | 0.29 |
| | | | | | Ratio ene to thiol | 2.5 |

Heat resistance data for the formulations of Examples 10-14, together with data for Comparative Example 1, are presented below:

| | hours at 200° C. | | | | | | | | | | | | |
|---|---|---|---|---|---|---|---|---|---|---|---|---|---|
| Ex. | 24 | 48 | 72 | 120 | 192 | 216 | 360 | 480 | 528 | 672 | 816 | 912 | 1000 |
| C1 | −1.10 | −1.62 | −1.85 | −2.23 | −2.80 | −2.89 | −3.46 | −3.79 | −3.93 | −4.19 | −4.55 | −4.65 | −4.75 |
| 10 | −3.13 | −3.18 | −3.24 | −3.33 | −3.44 | −3.50 | −3.62 | −3.74 | −3.85 | −3.92 | −4.00 | −4.06 | −4.11 |
| 11 | −2.33 | −2.41 | −2.47 | −2.61 | −2.84 | −2.97 | −3.53 | −3.89 | −4.05 | −4.45 | −4.76 | −4.91 | −5.02 |
| 12 | −2.76 | −3.35 | −3.66 | −4.06 | −4.52 | −4.67 | −5.29 | −5.67 | −5.82 | −6.33 | −6.48 | −6.75 | −7.02 |
| 13 | −3.13 | −3.80 | −4.20 | −4.50 | −4.80 | −4.90 | −5.15 | −5.29 | −5.44 | −5.66 | −5.80 | −5.92 | −5.95 |

Figure 3:
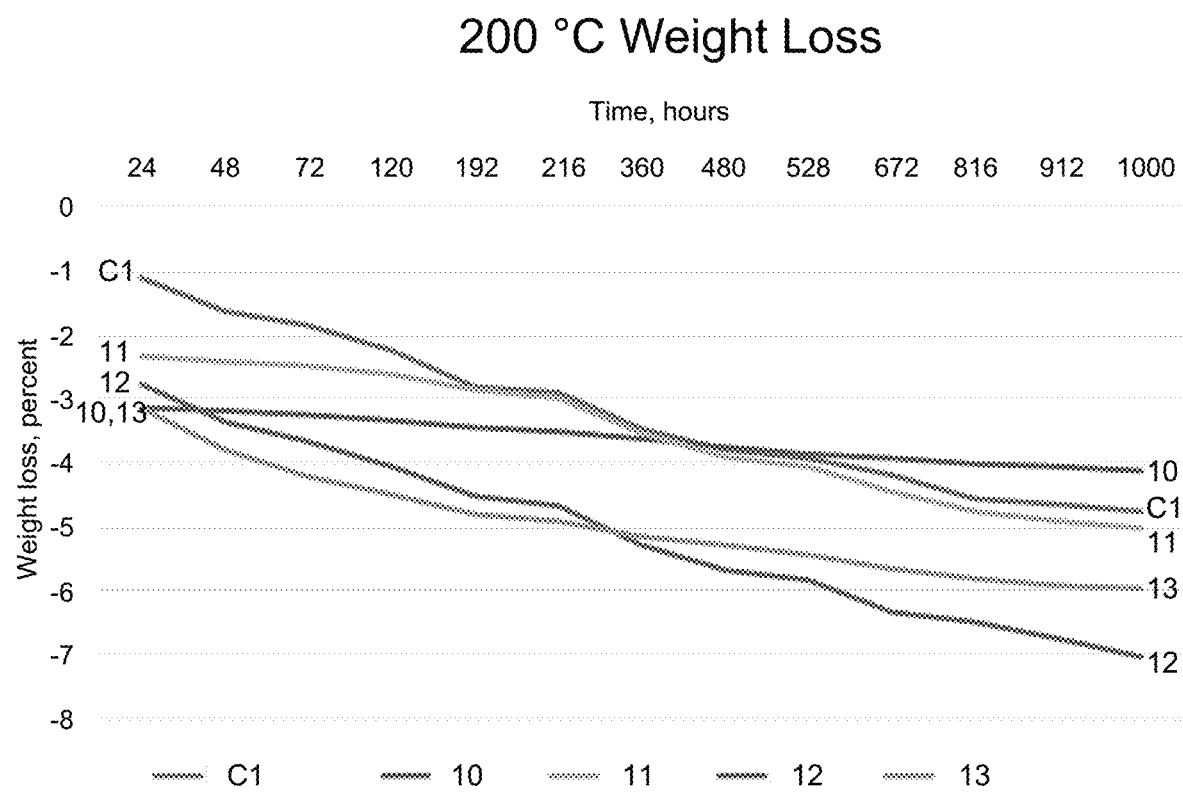
FIG. 3 is a graph of heat testing results for various curable compositions according to the disclosure and a comparative example.

These data are presented in FIG. 3.

Data were collected for the RTV silicone material of Comparative Example 1 at lower sample rates and longer exposure times (i.e., up to 1000 C). At 1000 hours, the RTV silicone material lost 4.75% of its weight.

Example 10 is a formulation according to the present disclosure, including a trifunctional ethylenically-unsaturated monomer and a trifunctional thiol monomer, with an ene:thiol ratio of about 2:1. Surprisingly, after 1000 hours, this sample with an ene:thiol ratio of 2:1 lost only about 4% of its weight after 1000 hours at 200 C. The formulation of Example 10 performed even better than the formulation of Example 9 having an ene:thiol ratio of ~1:1.

Example 11 is a formulation according to the present disclosure, including an aromatic trifunctional ethylenically-unsaturated monomer and an aliphatic tetrafunctional thiol monomer in a ene:thiol ratio of ~2:1. This formulation also performed well, with about 5% loss at 1000 hours.

Example 12 is a formulation according to the present disclosure, including an aromatic trifunctional ethylenically-unsaturated monomer and an aliphatic tetrafunctional thiol monomer in a ene:thiol ratio of ~1:1. This formulation also performed well, with about 7% loss at 1000 hours. But the performance was not as good as for the formulation of Example 11 having a ~2:1 ene:thiol ratio.

Example 13 is a formulation according to the present disclosure, including an aromatic trifunctional ethylenically-unsaturated monomer and an aliphatic hexafunctional thiol monomer in a ene:thiol ratio of ~2.5:1. This formulation also performed well, with about 6% loss at 1000 hours.

Various aspects of the disclosure are further described by the following numbered embodiments, which may be combined in any logically-consistent combination and permutation.

Embodiment 1

A radiation-curable optical fiber coating composition comprising at least 20 wt % of one or more at least trifunctional ethylenically unsaturated monomers, each having three or more free radical polymerizable ethylenic unsaturations;

at least 20 wt % of one or more at least trifunctional thiol monomers, each having three or more free radical polymerizable thiols; and an effective amount of a free radical photoinitiator, wherein the ratio of the number of polymerizable ethylenic unsaturations of the curable composition to the number of polymerizable thiols of the curable compositions is at least about 1.

Embodiment 2

The radiation-curable optical fiber coating composition according to embodiment 1, wherein the ratio of the number of polymerizable ethylenic unsaturations of the curable composition to the number of polymerizable thiols of the curable composition is at least 1.00.

Embodiment 3

The radiation-curable optical fiber coating composition according to embodiment 1, wherein the ratio of the number of polymerizable ethylenic unsaturations of the curable composition to the number of polymerizable thiols of the curable composition is at least 1.05, at least 1.10, or at least 1.25, or at least 1.35.

Embodiment 4

The radiation-curable optical fiber coating composition according to embodiment 1, wherein the ratio of the number of polymerizable ethylenic unsaturations of the curable composition to the number of polymerizable thiols of the curable composition is at least 1.50, at least 1.70, or at least 1.90.

Embodiment 5

The radiation-curable optical fiber coating composition according to any of embodiments 1-4, wherein the ratio of the number of polymerizable ethylenic unsaturations of the curable composition to the number of polymerizable thiols of the curable composition is no more than 5.00, no more than 4.00, or no more than 3.00.

Embodiment 6

The radiation-curable optical fiber coating composition according to any of embodiments 1-4, wherein the ratio of the number of polymerizable ethylenic unsaturations of the curable composition to the number of polymerizable thiols of the curable composition is no more than 2.75, no more than 2.50, or no more than 2.30.

Embodiment 7

The radiation-curable optical fiber coating composition according to any of embodiments 1-6, wherein the ratio of the number of polymerizable ethylenic unsaturations of the one or more at least trifunctional ethylenically unsaturated monomers to the number of polymerizable thiols of the one or more at least trifunctional thiol monomers is at least 1.00.

Embodiment 8

The radiation-curable optical fiber coating composition according to any of embodiments 1-6, wherein the ratio of the number of polymerizable ethylenic unsaturations of the one or more at least trifunctional ethylenically unsaturated monomers to the number of polymerizable thiols of the one or more at least trifunctional thiol monomers is at least 1.05, at least 1.10, at least 1.25, or at least 1.35.

Embodiment 9

The radiation-curable optical fiber coating composition according to any of embodiments 1-6, wherein the ratio of the number of polymerizable ethylenic unsaturations of the one or more at least trifunctional ethylenically unsaturated monomers to the number of polymerizable thiols of the one or more at least trifunctional thiol monomers at least 1.50, at least 1.70, or at least 1.90.

Embodiment 10

The radiation-curable optical fiber coating composition according to any of embodiments 1-9, wherein the ratio of the number of polymerizable ethylenic unsaturations of the one or more at least trifunctional ethylenically unsaturated monomers to the number of polymerizable thiols of the one or more at least trifunctional thiol monomers is no more than 5.00, no more than 4.00, or no more than 3.00.

Embodiment 11

The radiation-curable optical fiber coating composition according to any of embodiments 1-9, wherein the ratio of the number of polymerizable ethylenic unsaturations of the one or more at least trifunctional ethylenically unsaturated monomers to the number of polymerizable thiols of the one or more at least trifunctional thiol monomers is no more than 2.75, no more than 2.50, or no more than 2.30.

Embodiment 12

The radiation-curable optical fiber coating composition according to any of embodiments 1-11, wherein the ratio of the number of polymerizable ethylenic unsaturations of the curable composition to the number of polymerizable thiols of the curable composition is in the range of 1.50 to 2.75.

Embodiment 13

The radiation-curable optical fiber coating composition according to any of embodiments 1-11, wherein the ratio of the number of polymerizable ethylenic unsaturations of the curable composition to the number of polymerizable thiols of the curable composition is in the range of 1.90 to 5.00, or in the range of 1.90-3.00.

Embodiment 14

The radiation-curable optical fiber composition according to any of embodiments 1-13, wherein the ratio of the number of polymerizable ethylenic unsaturations of the one or more at least trifunctional ethylenically unsaturated monomers to the number of polymerizable thiols of the one or more at least trifunctional ethylenically unsaturated monomers is in the range of 1.50 to 2.75.

Embodiment 15

The radiation-curable optical fiber composition according to any of embodiments 1-14, wherein the ratio of the number of polymerizable ethylenic unsaturations of the one or more at least trifunctional ethylenically unsaturated monomers to the number of polymerizable thiols of the one or more at least trifunctional ethylenically unsaturated monomers is in the range of 1.90 to 5.00, or in the range of 1.90-3.00.

Embodiment 16

The radiation-curable optical fiber coating composition according to any of embodiments 1-15, wherein the amount of the one or more at least trifunctional ethylenically unsaturated monomers is at least 25 wt %, e.g., at least 30 wt %.

Embodiment 17

The radiation-curable optical fiber coating composition according to any of embodiments 1-15, wherein the amount of the one or more at least trifunctional ethylenically unsaturated monomers is at least 35 wt %, e.g., at least 40 wt %.

Embodiment 18

The radiation-curable optical fiber coating composition according to any of embodiments 1-17, wherein the amount of the one or more at least trifunctional thiol monomers is at least about 25 wt %, e.g., at least 30 wt %.

Embodiment 19

The radiation-curable optical fiber coating composition according to any of embodiments 1-17, wherein the amount of the one or more at least trifunctional thiol monomers is at least 35 wt %, e.g., at least 40 wt %.

Embodiment 20

The radiation-curable optical fiber coating composition according to any of embodiments 1-19, wherein the weight average molecular weight of the at least trifunctional ethylenically unsaturated monomers is less than 900 g/mol, e.g., less than 750 g/mol, less than 600 g/mol, less than 400 g/mol, or less than 300 g/mol.

Embodiment 21

The radiation-curable optical fiber coating composition according to any of embodiments 1-20, wherein the one or more at least trifunctional ethylenically unsaturated monomers comprise at least one monomer selected from the group consisting of 1,3,5-triallyl-1,3-5-triazine-2,4,6(1H,3H,5H) trione (triallyl isocyanurate); 2,4,6-triallyloxy-1,3,5-triazine (triallyl cyanurate); triallyl trimesate; trimethylolpropane tri(meth)acrylate; ethoxylated trimethylolpropane tri(meth) acrylate; propoxylated trimethylolpropane tri(meth)acrylate; pentaerythritol tetra(meth)acrylate; ethoxylated pentaerythritol tetra(meth)acrylate; propoxylated pentaerythritol tetra (meth)acrylate; pentaerythritol tri(meth)acrylate; ethoxylated pentaerythritol tri(meth)acrylate; propoxylated pentaerythritol tri(meth)acrylate; ethoxylated glyceryl tri (meth)acrylate; propoxylated glyceryl tri(meth)acrylate; tris (2-hydroxyethyl)isocyanurate triacrylate; allylated or (meth) acrylated derivatives of hexamethoxymethylmelamine having the formula $C_3N_3$—$(N(CH_2OR)_2)_3$ in which each R is H, ($C_1$-$C_4$ alkyl)-, allyl-, or (meth)acryl($C_2$-$C_4$ alkyl)-, provided that at least 3 Rs are polymerizable) including, e.g., the compound in which each R is allyl, the compound in which 3 R are methyl and 3 R are (meth)acryloxybutyl, and the compound in which 3 R are methyl and 3 R are allyl; the compound of formula (I), above; the compound of formula (II) above; the compound of formula (III) above; the compound of formula (IV) above; the compound of formula (V) below; pentaerythritol allyl ether; and trimethylolpropane allyl ether.

Embodiment 22

The radiation-curable optical fiber coating composition according to embodiment 21, wherein at least 50 wt % (e.g., at least 75 wt %, or at least 95 wt %, or at least 98 wt %) of the total amount of the one or more at least trifunctional ethylenically unsaturated monomers is made up of 1,3,5-triallyl-1,3-5-triazine-2,4,6(1H,3H,5H)trione (triallyl isocyanurate); 2,4,6-triallyloxy-1,3,5-triazine (triallyl cyanurate); triallyl trimesate; trimethylolpropane tri(meth) acrylate; ethoxylated trimethylolpropane tri(meth)acrylate; propoxylated trimethylolpropane tri(meth)acrylate; pentaerythritol tetra(meth)acrylate; ethoxylated pentaerythritol tetra(meth)acrylate; propoxylated pentaerythritol tetra(meth)acrylate; pentaerythritol tri(meth)acrylate; ethoxylated pentaerythritol tri(meth)acrylate; propoxylated pentaerythritol tri(meth)acrylate; ethoxylated glyceryl tri(meth)acrylate; propoxylated glyceryl tri(meth)acrylate; tris(2-hydroxyethyl)isocyanurate triacrylate; allylated or (meth) acrylated derivatives of hexamethoxymethylmelamine having the formula $C_3N_3$—$(N(CH_2OR)_2)_3$ in which each R is H, ($C_1$-$C_4$ alkyl)-, allyl-, or (meth)acryl($C_2$-$C_4$alkyl)-, provided that at least 3 Rs are polymerizable) including, e.g., the compound in which each R is allyl, the compound in which 3 R are methyl and 3 R are (meth)acryloxybutyl, and the compound in which 3 R are methyl and 3 R are allyl; the compound of formula (I), above; the compound of formula (II) above; the compound of formula (III) above; the compound of formula (IV) above; the compound of formula (V) below; pentaerythritol allyl ether; and/or trimethylolpropane allyl ether.

Embodiment 23

The radiation-curable optical fiber coating composition according to any of embodiments 1-19, wherein the one or more at least trifunctional ethylenically unsaturated monomers comprise at least one monomer selected from the group consisting of 1,3,5-triallyl-1,3-5-triazine-2,4,6(1H,3H,5H) trione (triallyl isocyanurate); 2,4,6-triallyloxy-1,3,5-triazine (triallyl cyanurate); trimethylolpropane tri(meth)acrylate; pentaerythritol tetra(meth)acrylate; and derivatives of hexamethoxymethylmelamine having the formula $C_3N_3$—$(N(CH_2OR)_2)_3$ in which each R is allyl-, or (meth)acryl($C_2$-$C_4$alkyl)-including, e.g., the compound in which each R is allyl, and the compound in which 3 R are methyl and 3 R are allyl.

Embodiment 24

The radiation-curable optical fiber coating composition according to embodiment 23, wherein at least 50 wt % (e.g., at least 75 wt %, or at least 95 wt %, or at least 98 wt %) of the total amount of the one or more at least trifunctional ethylenically unsaturated monomers is made up of 1,3,5-triallyl-1,3-5-triazine-2,4,6(1H,3H,5H)trione (triallyl isocyanurate); 2,4,6-triallyloxy-1,3,5-triazine (triallyl cyanurate); trimethylolpropane tri(meth)acrylate; pentaerythritol tetra(meth)acrylate; and/or derivatives of hexamethoxymethylmelamine having the formula $C_3N_3$—$(N(CH_2OR)_2)_3$ in which each R is allyl-, or (meth)acryl($C_2$-$C_4$alkyl)-including, e.g., the compound in which each R is allyl, and the compound in which 3 R are methyl and 3 R are allyl.

Embodiment 25

The radiation-curable optical fiber coating composition according to any of embodiments 1-19, wherein the one or more at least trifunctional ethylenically unsaturated monomers comprise at least one monomer selected from the group consisting of 1,3,5-triallyl-1,3-5-triazine-2,4,6(1H,3H,5H) trione (triallyl isocyanurate) and 2,4,6-triallyloxy-1,3,5-triazine (triallyl cyanurate).

Embodiment 26

The radiation-curable optical fiber coating composition according to embodiment 25, wherein at least 50 wt % (e.g., at least 75 wt %, or at least 95 wt %, or at least 98 wt %) of the total amount of the one or more at least trifunctional ethylenically unsaturated monomers is made up of 1,3,5-triallyl-1,3-5-triazine-2,4,6(1H,3H,5H)trione (triallyl isocyanurate) and/or 2,4,6-triallyloxy-1,3,5-triazine (triallyl cyanurate).

Embodiment 27

The radiation-curable optical fiber coating composition according to any of embodiments 1-26, wherein the one or more at least trifunctional ethylenically unsaturated monomers comprise at least one at least trifunctional ethylenically unsaturated aromatic monomer.

Embodiment 28

The radiation-curable optical fiber coating composition according to any of embodiments 1-26 wherein at least 50 wt % (e.g., at least 75 wt %, at least 95 wt %, or at least 98 wt %) of the total amount of at least trifunctional ethylenically unsaturated monomer is made up of aromatic monomers.

Embodiment 29

The radiation-curable optical fiber coating composition according to any of embodiments 1-28, wherein the weight average molecular weight of the at least trifunctional thiol monomers is less than 900 g/mol, e.g., less than 750 g/mol, less than 600 g/mol, less than 400 g/mol, or less than 300 g/mol.

Embodiment 30

The radiation-curable optical fiber coating composition according to any of embodiments 1-29, wherein the one or more at least trifunctional thiol monomers comprise at least one monomer selected from the group consisting of tris(2-(3-mercaptopropionyloxy)ethyl)isocyanurate; tris(2-(3-mercaptobutyloxy)ethyl)isocyanurate; trimethylolpropane tris(3-mercaptoproprionate); pentaerythritol tetrakis(3-mercaptoproprionate); dipentaerythritol hexa(3-mercaptoproprionate); trimethylolpropane tris(thioglycolate); tris[2-(2-mercaptoacetyloxy)ethyl]isocyanurate; pentaerythritol tetrakis(3-thioglycolate); dipentaerythritol hexa(thioglycolate); 2,3-(dimercaptoethylthio)-1-mercaptopropane; and 1,2,3-trimercaptopropane.

Embodiment 31

The radiation-curable optical fiber coating composition according to embodiment 30, wherein at least 50 wt % (e.g., at least 75 wt %, or at least 95 wt %, or at least 98 wt %) of the total amount of the one or more at least trifunctional thiol monomers is made up of tris(2-(3-mercaptopropionyloxy)ethyl)isocyanurate; tris(2-(3-mercaptobutyloxy)ethyl)isocyanurate; trimethylolpropane tris(3-mercaptoproprionate); pentaerythritol tetrakis(3-mercaptoproprionate); dipentaerythritol hexa(3-mercaptoproprionate); trimethylolpropane tris(thioglycolate); tris[2-(2-mercaptoacetyloxy)ethyl]isocyanurate; pentaerythritol tetrakis(3-thioglycolate); dipentaerythritol hexa(thioglycolate); 2,3-(dimercaptoethylthio)-1-mercaptopropane; and/or 1,2,3-trimercaptopropane, Embodiment 32

The radiation-curable optical fiber coating composition according to any of embodiments 1-29, wherein the one or more at least trifunctional thiol monomers comprise at least one monomer selected from the group consisting of tris(2-(3-mercaptopropionyloxy)ethyl)isocyanurate; trimethylolpropane tris(3-mercaptoproprionate); pentaerythritol tetrakis(3-mercaptoproprionate); dipentaerythritol hexa(3-mercaptoproprionate); and tris[2-(2-mercaptoacetyloxy)ethyl]isocyanurate.

Embodiment 33

The radiation-curable optical fiber coating composition according to embodiment 32, wherein at least 50 wt % (e.g., at least 75 wt %, or at least 95 wt %, or at least 98 wt %) of the total amount of the one or more at least trifunctional thiol monomers is made up of tris(2-(3-mercaptopropionyloxy)ethyl)isocyanurate; trimethylolpropane tris(3-mercaptoproprionate); pentaerythritol tetrakis(3-mercaptoproprionate); dipentaerythritol hexa(3-mercaptoproprionate); and/or tris[2-(2-mercaptoacetyloxy)ethyl]isocyanurate.

Embodiment 34

The radiation-curable optical fiber coating composition according to any of embodiments 1-33, wherein the one or more at least trifunctional thiol monomers comprise at least one at least trifunctional aromatic thiol monomer.

Embodiment 35

The radiation-curable optical fiber coating composition according to any of embodiments 1-33 wherein at least 50 wt % (e.g., at least 75 wt %, at least 95 wt %, or at least 98 wt %) of the total amount of at least trifunctional thiol monomer is made up of aromatic monomers.

Embodiment 36

The radiation-curable optical fiber coating composition according to any of embodiments 1-35, further comprising one or more monofunctional or difunctional ethylenically unsaturated monomers.

Embodiment 37

The radiation-curable optical fiber coating composition according to embodiment 36, wherein the one or more monofunctional or difunctional ethylenically unsaturated monomers are selected from the group consisting of trimethylolpropane diallyl ether, trimethylolpropane di(meth)acrylate, allyl- or (meth)acryl terminated polyols, allyl- or (meth)acryl-terminated urethane oligomers, maleimides, bisallyl bisphenol A; ortho,ortho-bisallyl bisphenol A, bisphenol A di(meth)acrylate, alkoxylated bisphenol A di(meth)acrylate, bisphenol A diglycidyl ether di(meth)acrylate, isobornyl (meth)acrylate, phenoxyethyl (meth)acrylate, N,N-dimethylacrylamide, N,N-diethylacrylamide, hexyl (meth)acrylate, 2-ethylhexyl (meth)acrylate, isobornyl (meth)acrylate, decyl (meth)acrylate, lauryl (meth)acrylate, stearyl (meth)acrylate, 2-ethoxyethoxy-ethyl (meth)acrylate, lauryl vinyl ether, 2-ethylhexyl vinyl ether, N-vinyl formamide, isodecyl (meth)acrylate, isooctyl (meth)acrylate, vinyl-caprolactam, N-vinyl pyrrolidone, ethyleneglycolphenylether (meth)acrylate, polyethyleneglycolphenylether (meth)acrylate, polypropyleneglycolphenylether (meth)acrylate, alkyl-substituted phenyl derivatives of the above monomers, such as polyethyleneglycolnonylphenyl-ether (meth)acrylate, $C_2$-$C_{18}$ hydrocarbon-diol di(meth)acrylate, $C_4$-$C_{18}$ hydrocarbon divinyl ethers, 1,6-hexanediol di(meth)acrylate, hexanedioldivinylether, triethylene-glycol di(meth)acrylate, ethoxylated bisphenol-A di(meth)acrylate, and tripropyleneglycol di(meth)acrylate and diallylphthalate.

Embodiment 38

The radiation-curable optical fiber coating composition according to any of embodiments 1-37, wherein the total amount of any monofunctional or difunctional ethylenically unsaturated monomers is no more than 50 wt % of the curable composition (e.g., no more than 40 wt %, no more than 30 wt %).

Embodiment 39

The radiation-curable optical fiber coating composition according to any of embodiments 1-37, wherein the total amount of any monofunctional or difunctional ethylenically unsaturated monomers is no more than 20 wt % of the curable composition (e.g., no more than 10 wt %).

Embodiment 40

The radiation-curable optical fiber coating composition according to any of embodiments 1-37, wherein the total amount of any monofunctional or difunctional ethylenically unsaturated monomers is no more than 5 wt % of the curable composition (e.g., no more than 1 wt %).

Embodiment 41

The radiation-curable optical fiber coating composition according to any of embodiments 1-40, further comprising one or more monofunctional or difunctional thiol monomers.

Embodiment 42

The radiation-curable optical fiber coating composition according to embodiment 41, wherein the one or more monofunctional or difunctional thiol monomers are selected from the group consisting of 2,5-dimercaptomethyl-1,4-dithiane, 2,3-dimercapto-1-propanol, 2-mercapto-ethylsulfide, ethylene glycol bis(thioglycolate), ethylene glycol bis(3-mercaptopropionate), 1,6-hexanedithiol, 1,2-benzenedithiol, 1,3-benzenedithiol, and isophorone diurethane thiol.

Embodiment 43

The radiation-curable optical fiber coating composition according to any of embodiments 1-42, wherein the total amount of any monofunctional or difunctional thiol monomers is no more than 50 wt % of the curable composition (e.g., no more than 40 wt %, no more than 30 wt %).

Embodiment 44

The radiation-curable optical fiber coating composition according to any of embodiments 1-42, wherein the total amount of any monofunctional or difunctional thiol monomers is no more than 20 wt % of the curable composition (e.g., no more than 10 wt %).

Embodiment 45

The radiation-curable optical fiber coating composition according to any of embodiments 1-42, wherein the total amount of any monofunctional or difunctional thiol monomers is no more than 5 wt % of the curable composition (e.g., no more than 1 wt %).

Embodiment 46

The radiation-curable optical fiber coating composition according to any of embodiments 1-42, wherein the total amount of any monofunctional thiol monomers is no more than 5 wt % of the curable composition (e.g., no more than 1 wt %).

Embodiment 47

The radiation-curable optical fiber coating composition according to any of embodiments 1-46, further comprising one or more copolymerizable oligomers.

Embodiment 48

The radiation-curable optical fiber coating composition according to embodiment 47, wherein the one or more copolymerizable oligomers are selected from the group consisting of epoxy (meth)acrylates, (meth)acrylate-terminated polyglycols or other polyethers, (meth)acrylate-terminated polyesters, and (meth)acrylate-terminated urethane oligomers.

Embodiment 49

The radiation-curable optical fiber coating composition according to any of embodiments 1-48, wherein the total amount of any copolymerizable oligomers is no more than 50 wt % of the curable composition (e.g., no more than 40 wt %, no more than 30 wt %).

Embodiment 50

The radiation-curable optical fiber coating composition according to any of embodiments 1-48, wherein the total amount of any copolymerizable oligomers is no more than 20 wt % of the curable composition (e.g., no more than 10 wt %).

Embodiment 51

The radiation-curable optical fiber coating composition according to any of embodiments 1-48, wherein the total amount of any copolymerizable oligomers is no more than 5 wt % of the curable composition (e.g., no more than 1 wt %).

Embodiment 52

The radiation-curable optical fiber coating composition according to any of embodiments 1-51, wherein the composition is substantially solvent-free.

Embodiment 53

The radiation-curable optical fiber coating composition according to any of embodiments 1-52, wherein the free radical photoinitiator is present in an effective amount in the range of 0.01 wt % to 5 wt %.

Embodiment 54

The radiation-curable optical fiber coating composition according to any of embodiments 1-53, wherein the free radical photoinitiator is selected from, 2-hydroxy-2-methyl-1-phenypropan-1-one (PHOTOCURE 1173), 2,4,6 trimethylbenzoyl phenylphosphinic acid ethyl ester (IRGACURE 754), Benzeneacetic acid, .alpha.-oxo-, 1,1'-(oxydi-2,1-ethanediyl) (IRGACURE TPO-L); and combinations thereof.

Embodiment 55

The radiation-curable optical fiber coating composition according to any of embodiments 1-53, wherein the composition includes at least 35 wt % of the one or more at least trifunctional thiol monomers; and at least 35 wt % of the one or more at least trifunctional ethylenically-unsaturated monomers; and the ratio of the number of polymerizable ethylenic unsaturations of the curable composition to the number of polymerizable thiols of the curable composition is 1.25-5.00.

Embodiment 56

The radiation-curable optical fiber coating composition according to any of embodiments 1-53, wherein the composition includes at least 35 wt % of the one or more at least trifunctional thiol monomers, the weight average molecular weight of the at least trifunctional ethylenically unsaturated monomers being less than 900 g/mol; and at least 35 wt % of the one or more at least trifunctional ethylenically-unsaturated monomers, the weight average molecular weight of the at least trifunctional thiol monomers being less than 900 g/mol; and the ratio of the number of polymerizable ethylenic unsaturations of the curable composition to the number of polymerizable thiols of the curable composition is 1.25-5.00.

Embodiment 57

The radiation-curable optical fiber coating composition according to any of embodiments 1-53, wherein the composition includes at least 35 wt % of the one or more at least trifunctional thiol monomers, in which at least 75% of the total amount of the one or more at least trifunctional ethylenically unsaturated monomers is made up of 1,3,5-triallyl-1,3-5-triazine-2,4,6(1H,3H,5H)trione (triallyl isocyanurate); 2,4,6-triallyloxy-1,3,5-triazine (triallyl cyanurate); trimethylolpropane tri(meth)acrylate; pentaerythritol tetra(meth)acrylate; and/or derivatives of hexamethoxymethylmelamine having the formula $C_3N_3$—$(N(CH_2OR)_2)_3$ in which each R is allyl-, or (meth)acryl($C_2$-$C_4$alkyl)-including, e.g., the compound in which each R is allyl, and the compound in which 3 R are methyl and 3 R are allyl; and at least 35 wt % of the one or more at least trifunctional ethylenically-unsaturated monomers, in which at least 75% of the total amount of the one or more at least trifunctional thiol monomers is made up of tris(2-(3-mercaptopropionyloxy)ethyl)isocyanurate; tris(2-(3-mercaptobutyloxy)ethyl) isocyanurate; trimethylolpropane tris(3-mercaptoproprionate); pentaerythritol tetrakis(3-mercaptoproprionate); dipentaerythritol hexa(3-mercaptoproprionate); trimethylolpropane tris(thioglycolate); tris[2-(2-mercaptoacetyloxy) ethyl]isocyanurate; pentaerythritol tetrakis(3-thioglycolate); dipentaerythritol hexa(thioglycolate); 2,3-(dimercaptoethylthio)-1-mercaptopropane; and/or 1,2,3-trimercaptopropane; and the ratio of the number of polymerizable ethylenic unsaturations of the curable composition to the number of polymerizable thiols of the curable composition is 1.25-5.00.

Embodiment 58

The radiation curable optical fiber coating composition according to any of embodiments 1-57,
wherein the ratio of the number of polymerizable ethylenic unsaturations of the curable composition to the number of polymerizable thiols of the curable composition is in the range of 1.90-3.00;
wherein the amount of the one or more at least trifunctional ethylenically unsaturated monomers is at least 35 wt %;
wherein the amount of the one or more at least trifunctional thiol monomers is at least 35 wt %;
wherein the weight average molecular weight of the at least trifunctional ethylenically unsaturated monomers is less than 900 g/mol;
wherein at least 50 wt % of the total amount of at least trifunctional ethylenically unsaturated monomer is made up of aromatic monomers;
wherein the weight average molecular weight of the at least trifunctional thiol monomers is less than 900 g/mol;
wherein at least 50 wt % of the total amount of at least trifunctional thiol monomer is made up of aromatic monomers;
having no more than 30 wt % of monofunctional or difunctional ethylenically unsaturated monomers;
having no more than 20 wt % of copolymerizable oligomers; and
wherein the composition is substantially solvent-free.

Embodiment 59

The radiation-curable optical fiber coating composition according to any of embodiments 1-58, exhibiting no more than 4% weight loss at 500 hours and no more than 6% weight loss at 1000 hours at 200 C in air when cured as a film 7 mm in thickness by exposure to a metal halide lamp and then allowed to age for at least one day before heat testing.

Embodiment 60

The radiation-curable optical fiber coating composition according to any of embodiments 1-58, exhibiting no more than 3% weight loss at 500 hours and no more than 5% weight loss at 1000 hours at 200 C in air when cured as a film 7 mm in thickness by exposure to a metal halide lamp and then allowed to age for at least one day before heat testing.

Embodiment 61

The radiation-curable optical fiber coating composition according to any of embodiments 1-60, having a viscosity in the range of 100 cP-200 cP at 25° C.

Embodiment 62

The radiation-curable optical fiber coating composition according to any of embodiments 1-60, having a viscosity in the range of 1000 cP-5000 cP at 25° C.

Embodiment 63

A cured reaction product of a radiation-curable optical fiber coating composition according to any of embodiments 1-62.

Embodiment 64

A cured reaction product according to embodiment 63, exhibiting no more than 4% weight loss at 500 hours and no more than 6% weight loss at 1000 hours at 200° C. in air.

Embodiment 65

A cured reaction product according to embodiment 63, exhibiting no more than 3% weight loss at 500 hours and no more than 5% weight loss at 1000 hours at 200° C. in air.

Embodiment 66

A coated optical fiber comprising:
a glass optical fiber comprising a glass core and a glass cladding disposed about the glass core; and
the cured reaction product according to any of embodiments 63-65 disposed about the glass optical fiber.

Embodiment 67

A method for making a coated optical fiber, the method comprising
providing a glass optical fiber comprising a glass core and a glass cladding disposed about the glass core;
disposing the radiation-curable optical fiber coating composition according to any of embodiments 1-62 about the glass optical fiber (e.g., on the surface of the glass optical fiber); and
curing the radiation-curable optical fiber coating composition disposed about the glass optical fiber by exposing it to ultraviolet radiation.

What is claimed is:

1. A coated optical fiber comprising:
a glass optical fiber comprising a glass core and a glass cladding disposed about the glass core; and
a cured reaction product of a radiation-curable optical fiber coating composition disposed about the glass optical fiber, the radiation-curable optical fiber coating composition comprising
at least 20 wt % of one or more at least trifunctional ethylenically unsaturated monomers, each having three or more free radical polymerizable ethylenic unsaturations;
at least 20 wt % of one or more at least trifunctional thiol monomers, each having three or more free radical polymerizable thiols; and
an effective amount of a free radical photoinitiator,
wherein a ratio of a number of polymerizable ethylenic unsaturations of the radiation-curable optical fiber coating composition to a number of polymerizable thiols of the radiation-curable optical fiber coating composition in a range of 1.90 to 5.00, and
wherein at least 50 wt % of a total amount of the one or more at least trifunctional ethylenically unsaturated monomer is made up of aromatic monomers and/or at least 50 wt % of a total amount of the one or more at least trifunctional thiol monomers is made of up aromatic monomers.

2. The coated optical fiber according to claim 1, wherein an amount of the one or more at least trifunctional ethylenically unsaturated monomers is at least 35 wt %.

3. The coated optical fiber according to claim 1, wherein an amount of the one or more at least trifunctional thiol monomers is at least 35 wt %.

4. The coated optical fiber according to claim 1, wherein a weight average molecular weight of the one or more at least trifunctional ethylenically unsaturated monomers is less than 900 g/mol.

5. The coated optical fiber according to claim 1, wherein at least 50% of a total amount of the one or more at least trifunctional ethylenically unsaturated monomers is made up of 1,3,5-triallyl-1,3-5-triazine-2,4,6(1H,3H,5H)trione (triallyl isocyanurate); 2,4,6-triallyloxy-1,3,5-triazine (triallyl cyanurate); triallyl trimesate; trimethylolpropane tri(meth)acrylate; ethoxylated trimethylolpropane tri(meth)acrylate; propoxylated trimethylolpropane tri(meth)acrylate; pentaerythritol tetra(meth)acrylate; ethoxylated pentaerythritol tetra(meth)acrylate; propoxylated pentaerythritol tetra(meth)acrylate; pentaerythritol tri(meth)acrylate; ethoxylated pentaerythritol tri(meth)acrylate; propoxylated pentaerythritol tri(meth)acrylate; ethoxylated glyceryl tri(meth)acrylate; propoxylated glyceryl tri(meth)acrylate; tris(2-hydroxyethyl)isocyanurate triacrylate; allylated or (meth)acrylated derivatives of hexamethoxymethylmelamine having the formula $C_3N_3$—$(N(CH_2OR)_2)_3$ in which each R is H, $C_4$ alkyl-, allyl-, or (meth)acryl($C_2$-$C_4$ alkyl)-, provided that at least 3 Rs are polymerizable; the compound of any of formulae (I)-(VI)

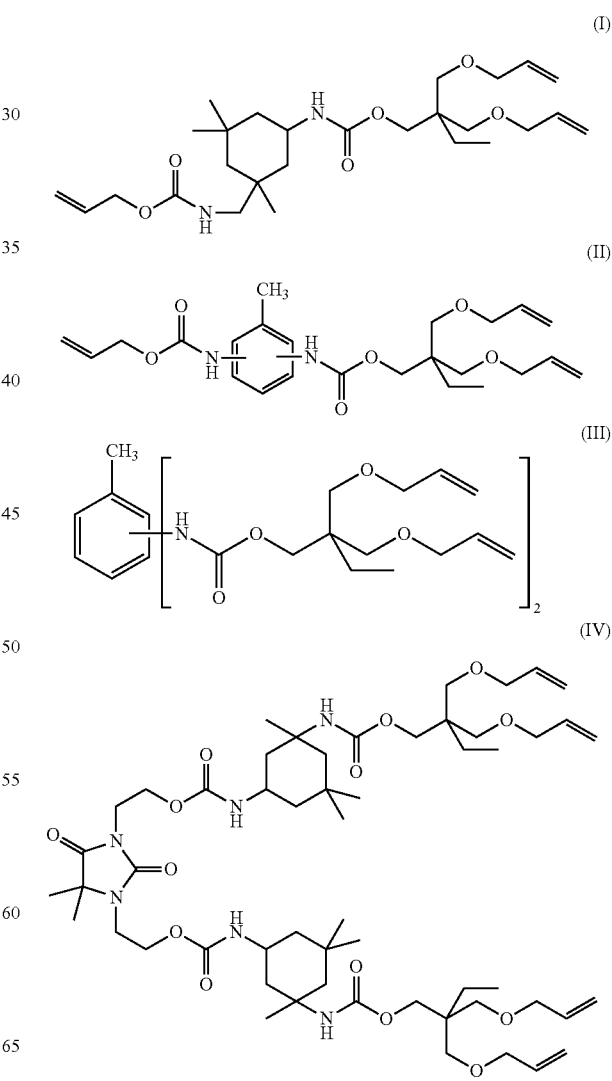

-continued

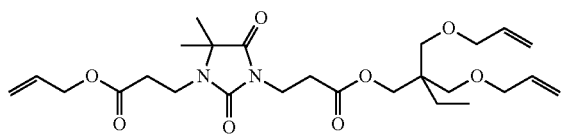
(V)

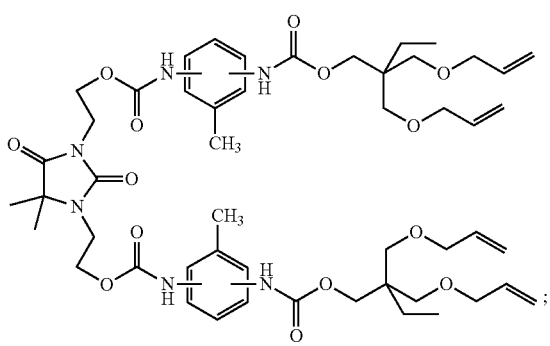
(VI)

pentaerythritol allyl ether having at least 3 allyl substitutions; and/or trimethylolpropane triallyl ether.

6. The coated optical fiber according to claim 1 wherein at least 50 wt % of a total amount of the one or more at least trifunctional ethylenically unsaturated monomers is made up of aromatic monomers.

7. The coated optical fiber according to claim 1, wherein a weight average molecular weight of the one or more at least trifunctional thiol monomers is less than 900 g/mol.

8. The coated optical fiber according to claim 1, wherein at least 50 wt % of a total amount of the one or more at least trifunctional thiol monomers is made up of tris(2-(3-mercaptopropionyloxy)ethyl)isocyanurate; tris(2-(3-mercaptobutyloxy)ethyl)isocyanurate; trimethylolpropane tris(3-mercaptoproprionate); pentaerythritol tetrakis(3-mercaptoproprionate); dipentaerythritol hexa(3-mercaptoproprionate); trimethylolpropane tris(thioglycolate); tris[2-(2-mercaptoacetyloxy)ethyl] isocyanurate; pentaerythritol tetrakis(3-thioglycolate); dipentaerythritol hexa(thioglycolate); 2,3-(dimercaptoethylthio)-1-mercaptopropane; and/or 1,2,3-trimercaptopropane.

9. The coated optical fiber according to claim 1 wherein at least 50 wt % of a total amount of the one or more at least trifunctional thiol monomers is made up of aromatic monomers.

10. The coated optical fiber according to claim 1, further comprising one or more monofunctional or difunctional ethylenically unsaturated monomers in a total amount of no more than 50 wt % of the radiation-curable optical fiber coating composition.

11. The coated optical fiber according to claim 10, wherein the one or more monofunctional or difunctional ethylenically unsaturated monomers are selected from the group consisting of trimethylolpropane diallyl ether, trimethylolpropane di(meth)acrylate, allyl- or (meth)acryl terminated polyols, allyl- or (meth)acryl-terminated urethane oligomers, maleimides, bisallyl bisphenol A; ortho,orthobisallyl bisphenol A, bisphenol A di(meth)acrylate, alkoxylated bisphenol A di(meth)acrylate, bisphenol A diglycidyl ether di(meth)acrylate, isobornyl (meth)acrylate, phenoxyethyl (meth)acrylate, N,N-dimethylacrylamide, N,N-diethylacrylamide, hexyl (meth)acrylate, 2-ethylhexyl (meth)acrylate, isobornyl (meth)acrylate, decyl (meth)acrylate, lauryl (meth)acrylate, stearyl (meth)acrylate, 2-ethoxyethoxyethyl (meth)acrylate, lauryl vinyl ether, 2-ethylhexyl vinyl ether, N-vinyl formamide, isodecyl (meth)acrylate, isooctyl (meth)acrylate, vinyl-caprolactam, N-vinylpyrrolidone, ethyleneglycolphenylether (meth)acrylate, polyethyleneglycolphenylether (meth)acrylate, polypropyleneglycolphenylether (meth)acrylate, alkyl-substituted phenyl derivatives of the above monomers, polyethyleneglycolnonylphenyl-ether (meth)acrylate, $C_2$-$C_{18}$ hydrocarbon-diol di(meth)acrylate, $C_4$-$C_{18}$ hydrocarbon divinyl ethers, 1,6-hexanediol di(meth)acrylate, hexanedioldivinylether, triethylene-glycol di(meth)acrylate, ethoxylated bisphenol-A di(meth)acrylate, and tripropyleneglycol di(meth)acrylate and diallylphthalate.

12. The coated optical fiber according to claim 1, further comprising one or more monofunctional or difunctional thiol monomers wherein a total amount of any monofunctional or difunctional thiol monomers is no more than 50 wt % of the radiation-curable optical fiber coating composition.

13. The coated optical fiber according to claim 12, wherein the one or more monofunctional or difunctional thiol monomers are selected from the group consisting of 2,5-dimercaptomethyl-1,4-dithiane, 2,3-dimercapto-1-propanol, 2-mercapto-ethylsulfide, ethylene glycol bis(thioglycolate), ethylene glycol bis(3-mercaptopropionate), 1,6-hexanedithiol, 1,2-benzenedithiol, 1,3-benzenedithiol, and isophorone diurethane thiol.

14. The coated optical fiber according to claim 1, further comprising one or more copolymerizable oligomers in a total amount of no more than 20 wt % of the radiation-curable optical fiber coating composition.

15. The coated optical fiber according to claim 1, wherein the radiation-curable optical fiber coating composition is substantially solvent-free.

16. The coated optical fiber according to claim 1, wherein the radiation-curable optical fiber coating composition includes at least 35 wt % of the one or more at least trifunctional thiol monomers, a weight average molecular weight of the one or more at least trifunctional thiol monomers being less than 900 g/mol; and at least 35 wt % of the one or more at least trifunctional ethylenically-unsaturated monomers, a weight average molecular weight of the one or more at least trifunctional ethylenically unsaturated monomers being less than 900 g/mol.

17. The coated optical fiber according to claim 1, wherein the radiation-curable optical fiber coating composition exhibits no more than 4% weight loss at 500 hours and no more than 6% weight loss at 1000 hours at 200° C. in air when cured as a film 7 mm in thickness by exposure to a metal halide lamp and then allowed to age for at least one day before heat testing.

18. The coated optical fiber according to claim 1,
wherein an amount of the one or more at least trifunctional ethylenically unsaturated monomers is at least 35 wt %;
wherein an amount of the one or more at least trifunctional thiol monomers is at least 35 wt %;
wherein a weight average molecular weight of the one or more at least trifunctional ethylenically unsaturated monomers is less than 900 g/mol;
wherein at least 50 wt % of a total amount of the one or more at least trifunctional ethylenically unsaturated monomer is made up of aromatic monomers;
wherein a weight average molecular weight of the one or more at least trifunctional thiol monomers is less than 900 g/mol;

wherein at least 50 wt % of a total amount of the one or more at least trifunctional thiol monomer is made up of aromatic monomers;
having no more than 30 wt % of monofunctional or difunctional ethylenically unsaturated monomers;
having no more than 20 wt % of copolymerizable oligomers; and
wherein the radiation-curable optical fiber coating composition is substantially solvent-free.

19. A method for making a coated optical fiber according to claim 1, the method comprising
providing a glass optical fiber comprising a glass core and a glass cladding disposed about the glass core;
disposing the radiation-curable optical fiber coating composition about the glass optical fiber; and
curing the radiation-curable optical fiber coating composition disposed about the glass optical fiber by exposing it to ultraviolet radiation.

20. A coated optical fiber comprising:
a glass optical fiber comprising a glass core and a glass cladding disposed about the glass core; and
a cured reaction product of a radiation-curable optical fiber coating composition disposed about the glass optical fiber, the radiation-curable optical fiber coating composition comprising
at least 20 wt % of one or more at least trifunctional ethylenically unsaturated monomers, each having three or more free radical polymerizable ethylenic unsaturations;
at least 20 wt % of one or more at least trifunctional thiol monomers, each having three or more free radical polymerizable thiols; and
an effective amount of a free radical photoinitiator,
wherein at least 50 wt % of a total amount of the one or more at least trifunctional ethylenically unsaturated monomer is made up of aromatic monomers and/or at least 50 wt % of a total amount of the one or more at least trifunctional thiol monomers is made of up aromatic monomers, and
wherein at least 50 wt % of a total amount of the one or more at least trifunctional thiol monomers is made of up aromatic monomers.

21. A coated optical fiber comprising:
a glass optical fiber comprising a glass core and a glass cladding disposed about the glass core; and
a cured reaction product of a radiation-curable optical fiber coating composition disposed about the glass optical fiber, the radiation-curable optical fiber coating composition comprising
at least 20 wt % of one or more at least trifunctional ethylenically unsaturated monomers, each having three or more free radical polymerizable ethylenic unsaturations;
at least 20 wt % of one or more at least trifunctional thiol monomers, each having three or more free radical polymerizable thiols; and
an effective amount of a free radical photoinitiator,
wherein a ratio of a number of polymerizable ethylenic unsaturations of the radiation-curable optical fiber coating composition to a number of polymerizable thiols of the radiation-curable optical fiber coating composition is at least about 1,
wherein at least 50 wt % of a total amount of the one or more at least trifunctional ethylenically unsaturated monomer is made up of aromatic monomers and/or at least 50 wt % of a total amount of the one or more at least trifunctional thiol monomers is made of up aromatic monomers, and
wherein at least 50% of a total amount of the one or more at least trifunctional ethylenically unsaturated monomers is made up of 1,3,5-triallyl-1,3-5-triazine-2,4,6(1H,3H,5H)trione (triallyl isocyanurate); 2,4,6-triallyloxy-1,3,5-triazine (triallyl cyanurate); triallyl trimesate; trimethylolpropane tri(meth)acrylate; ethoxylated trimethylolpropane tri(meth)acrylate; propoxylated trimethylolpropane tri(meth)acrylate; pentaerythritol tetra(meth)acrylate; ethoxylated pentaerythritol tetra(meth)acrylate; propoxylated pentaerythritol tetra(meth)acrylate; pentaerythritol tri(meth)acrylate; ethoxylated pentaerythritol tri(meth)acrylate; propoxylated pentaerythritol tri(meth)acrylate; ethoxylated glyceryl tri(meth)acrylate; propoxylated glyceryl tri(meth)acrylate; tris(2-hydroxyethyl)isocyanurate triacrylate; allylated or (meth)acrylated derivatives of hexamethoxymethylmelamine having the formula $C_3N_3$—$(N(CH_2OR)_2)_3$ in which each R is H, ($C_1$-$C_4$ alkyl)-, allyl-, or (meth)acryl($C_2$-$C_4$alkyl)-, provided that at least 3 Rs are polymerizable; the compound of any of formulae (I)-(VI)

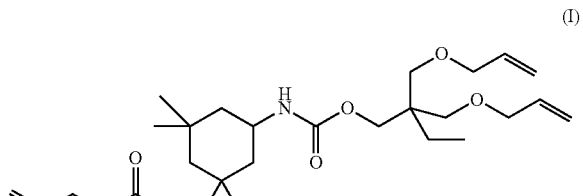

(I)

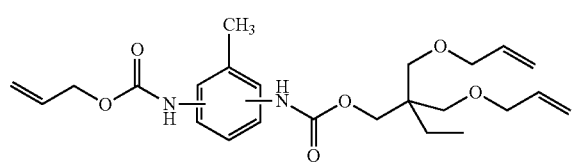

(II)

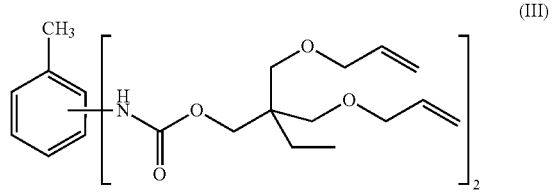

(III)

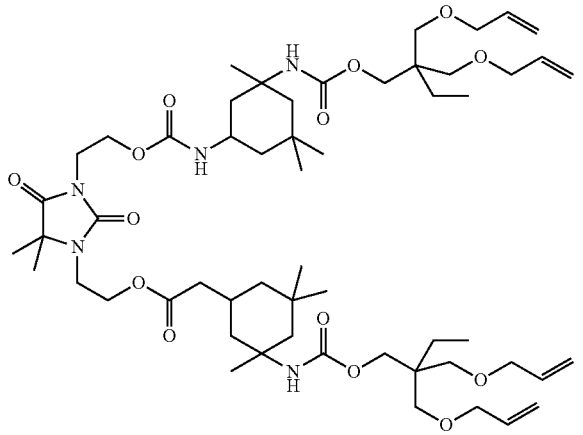

(IV)

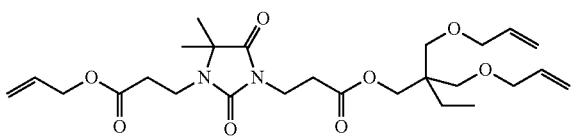

(V)

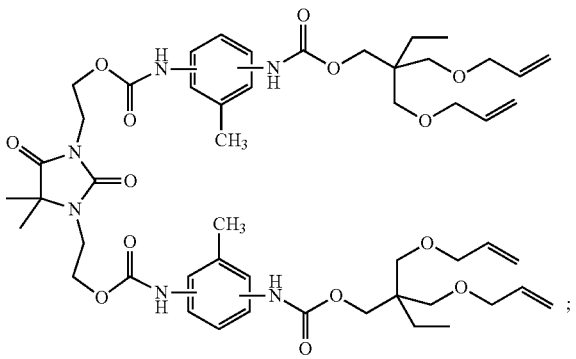

(VI)

pentaerythritol allyl ether having at least 3 allyl substitutions; and/or trimethylolpropane triallyl ether.

22. The coated optical fiber according to claim 21, wherein the radiation-curable optical fiber coating composition includes at least 35 wt % of the one or more at least trifunctional thiol monomers, a weight average molecular weight of the one or more at least trifunctional thiol monomers being less than 900 g/mol, and at least 35 wt % of the one or more at least trifunctional ethylenically-unsaturated monomers, a weight average molecular weight of the one or more at least trifunctional ethylenically unsaturated monomers being less than 900 g/mol; and wherein the ratio of the number of polymerizable ethylenic unsaturations of the radiation-curable optical fiber coating composition to the number of polymerizable thiols of the radiation-curable optical fiber coating composition is 1.25-5.00.

* * * * *